(12) United States Patent
Cheng et al.

(10) Patent No.: US 11,300,790 B2
(45) Date of Patent: Apr. 12, 2022

(54) OPTICAL SEE-THROUGH FREE-FORM HEAD-MOUNTED DISPLAY

(71) Applicants: ARIZONA BOARD OF REGENTS ON BEHALF OF THE UNIVERSITY OF ARIZONA, Tucson, AZ (US); BEIJING INSTITUTE OF TECHNOLOGY, Beijing (CN)

(72) Inventors: Dewen Cheng, Beijing (CN); Hong Hua, Tucson, AZ (US); Yongtian Wang, Beijing (CN)

(73) Assignees: ARIZONA BOARD OF REGENTS ON BEHALF OF THE UNIVERSITY OF ARIZONA, Tucson, AZ (US); BEIJING INSTITUTE OF TECHNOLOGY, Beijing (CN)

( * ) Notice: Subject to any disclaimer, the term of this patent is extended or adjusted under 35 U.S.C. 154(b) by 229 days.

(21) Appl. No.: 16/541,929

(22) Filed: Aug. 15, 2019

(65) Prior Publication Data

US 2020/0103654 A1 Apr. 2, 2020

Related U.S. Application Data

(63) Continuation of application No. 14/956,632, filed on Dec. 2, 2015, now Pat. No. 10,416,452, which is a
(Continued)

(51) Int. Cl.
*G02B 27/01* (2006.01)
*G02B 17/08* (2006.01)
(Continued)

(52) U.S. Cl.
CPC ....... *G02B 27/0172* (2013.01); *G02B 17/006* (2013.01); *G02B 17/08* (2013.01);
(Continued)

(58) Field of Classification Search
CPC .... G02B 17/086; G02B 13/10; G02B 27/017; G02B 27/0172; G02B 17/08; G03B 21/00
(Continued)

(56) References Cited

U.S. PATENT DOCUMENTS

| 3,632,184 A | 1/1972 | King |
| 3,992,084 A | 11/1976 | Nakamura |

(Continued)

FOREIGN PATENT DOCUMENTS

| CN | 1252133 A | 5/2000 |
| CN | 101359089 A | 2/2009 |

(Continued)

OTHER PUBLICATIONS

H. Hua, "Enabling focus cues in head-mounted displays," Proceedings of the IEEE 105(5), 805-824 (2017).
(Continued)

*Primary Examiner* — Jordan M Schwartz
(74) *Attorney, Agent, or Firm* — Niels Haun; Dann, Dorfman, Herrell & Skillman, P.C.

(57) ABSTRACT

A see-through free-form head-mounted display including a wedge-shaped prism-lens having free-form surfaces and low F-number is provided.

21 Claims, 22 Drawing Sheets

Related U.S. Application Data continuation of application No. 14/010,956, filed on Aug. 27, 2013, now Pat. No. 9,239,453, which is a continuation of application No. 13/318,864, filed as application No. PCT/US2010/031799 on Apr. 20, 2010, now abandoned.

(60) Provisional application No. 61/214,117, filed on Apr. 20, 2009.

(51) Int. Cl.
  *G02B 13/10* (2006.01)
  *G03B 21/00* (2006.01)
  *G02B 17/00* (2006.01)

(52) U.S. Cl.
  CPC ............ *G02B 17/086* (2013.01); *G03B 21/00* (2013.01); *G02B 13/10* (2013.01); *G02B 27/017* (2013.01); *G02B 2027/013* (2013.01); *G02B 2027/0118* (2013.01)

(58) Field of Classification Search
  USPC ....... 359/454, 519, 578, 629–640, 720, 831, 359/833, 837; 385/14, 32
  See application file for complete search history.

(56) References Cited

U.S. PATENT DOCUMENTS

| | | |
|---|---|---|
| 4,669,810 A | 6/1987 | Wood |
| 4,753,522 A | 6/1988 | Nishina |
| 4,863,251 A | 9/1989 | Herloski |
| 5,109,469 A | 4/1992 | Duggan |
| 5,172,272 A | 12/1992 | Aoki |
| 5,172,275 A | 12/1992 | Dejager |
| 5,436,763 A | 7/1995 | Chen |
| 5,526,183 A | 6/1996 | Chen |
| 5,572,229 A | 11/1996 | Fisher |
| 5,621,572 A | 4/1997 | Fergason |
| 5,625,495 A | 4/1997 | Moskovich |
| 5,699,194 A | 12/1997 | Takahashi |
| 5,701,202 A | 12/1997 | Takahashi |
| 5,706,136 A | 1/1998 | Okuyama |
| 5,818,632 A | 10/1998 | Stephenson |
| 5,880,711 A | 3/1999 | Tamada |
| 5,880,888 A | 3/1999 | Schoenmakers |
| 5,917,656 A | 6/1999 | Hayakawa |
| 5,959,780 A | 9/1999 | Togino |
| 6,008,781 A | 12/1999 | Furness |
| 6,023,373 A | 2/2000 | Inoguchi |
| 6,028,606 A | 2/2000 | Kolb |
| 6,034,823 A | 3/2000 | Togino |
| 6,198,577 B1 | 3/2001 | Kedar |
| 6,201,646 B1 | 3/2001 | Togino |
| 6,236,521 B1 | 5/2001 | Nanba |
| 6,239,915 B1 | 5/2001 | Takagi |
| 6,243,199 B1 | 6/2001 | Hansen |
| 6,271,972 B1 | 8/2001 | Kedar |
| 6,384,983 B1 * | 5/2002 | Yamazaki ............ G02B 27/0172 345/8 |
| 6,396,639 B1 | 5/2002 | Takayoshi |
| 6,404,561 B1 | 6/2002 | Isono |
| 6,404,562 B1 | 6/2002 | Ota |
| 6,433,376 B2 | 8/2002 | Kim |
| 6,433,760 B1 | 8/2002 | Vaissie |
| 6,493,146 B2 | 12/2002 | Inoguchi |
| 6,510,006 B1 | 1/2003 | Togino |
| 6,563,648 B2 | 5/2003 | Gleckman |
| 6,646,811 B2 | 11/2003 | Inoguchi |
| 6,653,989 B2 | 11/2003 | Nakanishi |
| 6,671,099 B2 | 12/2003 | Nagata |
| 6,731,434 B1 | 5/2004 | Hua |
| 6,829,113 B2 | 12/2004 | Togino |
| 6,963,454 B1 | 11/2005 | Martins |
| 6,999,239 B1 | 2/2006 | Martins |
| 7,152,977 B2 | 12/2006 | Ruda |
| 7,177,083 B2 | 2/2007 | Holler |
| 7,230,583 B2 | 6/2007 | Tidwell |
| 7,249,853 B2 | 7/2007 | Weller-Brophy |
| 7,405,881 B2 | 7/2008 | Shimizu |
| 7,414,791 B2 | 8/2008 | Urakawa |
| 7,522,344 B1 | 4/2009 | Curatu |
| 8,467,133 B2 | 6/2013 | Miller |
| 8,503,087 B1 | 8/2013 | Amirparviz |
| 8,511,827 B2 | 8/2013 | Hua |
| 9,239,453 B2 | 1/2016 | Cheng |
| 9,310,591 B2 | 4/2016 | Hua |
| 9,874,760 B2 | 1/2018 | Hua |
| 2001/0009478 A1 | 7/2001 | Yamazaki |
| 2001/0048561 A1 * | 12/2001 | Heacock ............ G02B 27/0172 359/631 |
| 2002/0015116 A1 | 2/2002 | Park |
| 2002/0060850 A1 | 5/2002 | Takeyama |
| 2002/0063913 A1 | 5/2002 | Nakamura |
| 2003/0076591 A1 | 4/2003 | Ohmori |
| 2003/0090753 A1 | 5/2003 | Takeyama |
| 2004/0136097 A1 | 7/2004 | Park |
| 2004/0164927 A1 | 8/2004 | Suyama |
| 2004/0196213 A1 | 10/2004 | Tidwell |
| 2004/0218243 A1 * | 11/2004 | Yamazaki .......... G02B 17/0832 359/212.1 |
| 2004/0233551 A1 | 11/2004 | Takahashi |
| 2005/0036119 A1 | 2/2005 | Ruda |
| 2005/0179868 A1 | 8/2005 | Seo |
| 2005/0248849 A1 | 11/2005 | Urey |
| 2006/0119951 A1 | 6/2006 | McGuire |
| 2007/0109505 A1 | 5/2007 | Kubara |
| 2008/0094720 A1 | 4/2008 | Yamazaki |
| 2008/0291531 A1 | 11/2008 | Heimer |
| 2009/0115842 A1 | 5/2009 | Saito |
| 2009/0168010 A1 | 7/2009 | Vinogradov |
| 2010/0091027 A1 | 4/2010 | Oyama |
| 2010/0109977 A1 | 5/2010 | Yamazaki |
| 2010/0208372 A1 | 8/2010 | Heimer |
| 2010/0271698 A1 | 10/2010 | Kessler |
| 2010/0289970 A1 | 11/2010 | Watanabe |
| 2011/0037951 A1 | 2/2011 | Hua |
| 2011/0043644 A1 | 2/2011 | Munger |
| 2011/0075257 A1 | 3/2011 | Hua |
| 2011/0090389 A1 | 4/2011 | Saito |
| 2011/0221656 A1 | 9/2011 | Haddick |
| 2012/0013988 A1 | 1/2012 | Hutchin |
| 2012/0019557 A1 | 1/2012 | Aronsson |
| 2012/0050891 A1 | 3/2012 | Seidl |
| 2012/0057129 A1 | 3/2012 | Durnell |
| 2012/0081800 A1 | 4/2012 | Cheng |
| 2012/0113092 A1 | 5/2012 | Bar-Zeev |
| 2012/0160302 A1 | 6/2012 | Citron |
| 2012/0162549 A1 | 6/2012 | Gao |
| 2012/0242697 A1 | 9/2012 | Border |
| 2013/0100524 A1 | 4/2013 | Magarill |
| 2013/0112705 A1 | 5/2013 | McGill |
| 2013/0182317 A1 | 7/2013 | Takahashi |
| 2013/0187836 A1 | 7/2013 | Cheng |
| 2013/0222896 A1 | 8/2013 | Komatsu |
| 2013/0258461 A1 | 10/2013 | Sato |
| 2013/0285885 A1 | 10/2013 | Nowatzyk |
| 2013/0286053 A1 | 10/2013 | Fleck |
| 2013/0300634 A1 | 11/2013 | White |
| 2013/0329304 A1 | 12/2013 | Hua |
| 2014/0009845 A1 | 1/2014 | Cheng |
| 2014/0049833 A1 | 2/2014 | Totani |
| 2014/0071539 A1 | 3/2014 | Gao |
| 2014/0361957 A1 | 12/2014 | Hua |
| 2015/0168802 A1 | 6/2015 | Bohn |
| 2015/0177445 A1 | 6/2015 | Takagi |
| 2015/0201176 A1 | 7/2015 | Graziosi |
| 2015/0208061 A1 | 7/2015 | Yang |
| 2015/0277129 A1 | 10/2015 | Hua |
| 2015/0346495 A1 | 12/2015 | Welch |
| 2016/0011419 A1 | 1/2016 | Gao |
| 2016/0085075 A1 | 3/2016 | Cheng |
| 2016/0239985 A1 | 8/2016 | Haddick et al. |
| 2017/0078652 A1 | 3/2017 | Hua |

(56) References Cited

U.S. PATENT DOCUMENTS

| | | |
|---|---|---|
| 2017/0102545 A1 | 4/2017 | Hua |
| 2017/0202633 A1 | 7/2017 | Liu |
| 2018/0045949 A1 | 2/2018 | Hua |

FOREIGN PATENT DOCUMENTS

| | | |
|---|---|---|
| CN | 101424788 A | 5/2009 |
| EP | 0408344 | 1/1991 |
| EP | 1102105 | 5/2001 |
| JP | H03101709 | 4/1991 |
| JP | H09218375 A | 8/1997 |
| JP | H09297282 | 11/1997 |
| JP | H1013861 | 1/1998 |
| JP | H10307263 | 11/1998 |
| JP | H11326820 A | 11/1999 |
| JP | 2000249974 | 9/2000 |
| JP | 2001013446 | 1/2001 |
| JP | 2001066543 A | 3/2001 |
| JP | 2001145127 | 5/2001 |
| JP | 2001238229 | 8/2001 |
| JP | 2002148559 | 5/2002 |
| JP | 2003241100 | 8/2003 |
| JP | 2006091333 | 4/2006 |
| JP | 2006276884 A | 10/2006 |
| JP | 2007101930 | 4/2007 |
| JP | 2010072188 | 4/2010 |
| JP | 2014505381 | 2/2014 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2012064546 | 5/2012 |
| WO | 2012118573 | 9/2012 |
| WO | 2013112705 | 8/2013 |
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |

OTHER PUBLICATIONS

G. E. Favalora, "Volumetric 3D displays and application infrastructure," Computer, 38(8), 37-44 (2005).

H. Yu, K. Lee, J. Park, and Y. Park, "Ultrahigh-definition dynamic 3D holographic display by active control of volume speckle fields," Nature Photonics 11(3), 186 (2017).

G. Li, D. Lee, Y. Jeong, J. Cho, and B. Lee, "Holographic display for see-through augmented reality using mirror-lens holographic optical element," Opt. Letters 41(11), 2486-2489 (2016).

S. B. Kim and J. H. Park, "Optical see-through Maxwellian near-to-eye display with an enlarged eyebox," Opt. Letters 43(4), 767-770 (2018).

D. Lanman and D. Luebke, "Near-eye light field displays," ACM Trans. Graph. 32(6), 1-10 (2013).

H. Huang and H. Hua, "High-performance integral-imaging-based light field augmented reality display using freeform optics," Opt. Express 26(13), 17578-17590 (2018).

B. Liu, X. Sang, X. Yu, X. Gao, L. Liu, C. Gao, P. Wang, Y. Le, and J. Du, "Time-multiplexed light field display with 120-degree wide viewing angle". Opt. Express 27(24), pp. 35728-35739 (2019).

H. Huang and H. Hua, "Generalized methods and strategies for modeling and optimizing the optics of 3D head-mounted light field displays," Opt. Express 27(18), 25154-25171 (2019).

H. Huang and H. Hua, "Systematic characterization and optimization of 3D light field displays," Opt. Express 25(16), 18508-18525 (2017).

J. H. Park, S. W. Min, S. Jung, and B. Lee. "Analysis of viewing parameters for two display methods based on integral photography." Applied Optics 40, No. 29 5217-5232 (2001).

X. Wang, Y. Qin, H. Hua, Y. H. Lee, and S. T. Wu. "Digitally switchable multi-focal lens using freeform optics." Opt. Express 16;26(8):11007-17(2018).

X. Wang, and H. Hua. "Digitally Switchable Micro Lens Array for Integral Imaging." SID Symposium Digest of Technical Papers. vol. 51. No. 1. (2020).

M. Xu and H. Hua, "Finite-depth and varifocal head-mounted display based on geometrical lightguide," Opt. Express 28(8), 12121-12137 (2020).

Jason Geng: "Three-dimensional display technologies", Advances in Optics and Photonics, vol. 5, No. 4, Nov. 22, 2013 (Nov. 22, 2013), pp. 456-535.

Cheol-Joong Kim et al, "Depth plane adaptive integral imaging using a varifocal liquid lens array", Applied Optics, OSA, vol. 54, No. 10, Apr. 1, 2015 (Apr. 1, 2015), pp. 2565-2571.

Xin Shen et al: "Large depth of focus dynamic micro integral imaging for optical see-through augmented reality display using a focus-tunable lens", Applied Optics, vol. 57, No. 7, Mar. 1, 2018 (Mar. 1, 2018), p. B184.

Martinez-Cuenca R et al: "Progress in 3-D Multiperspective Display by Integral Imaging", Proceedings of the IEEE, IEEE. New York, us, vol. 97, No. 6, Jun. 1, 2009 (Jun. 1, 2009), pp. 1067-1077.

Kim Cheoljoong et al: "Depth-enhanced integral imaging display system with time-multiplexed depth planes using a varifocal liquid lens array", Proceedings of SPIE, IEEE, US, vol. 9385, Mar. 11, 2015 (Mar. 11, 2015), pp. 93850D-93850D.

Huan Deng et al: "The Realization of Computer Generated Integral Imaging Based on Two Step Pickup Method", Photonics and Optoelectronic (SOPO), 2010 Symposium On, IEEE, Piscataway, NJ, USA, Jun. 19, 2010 (Jun. 19, 2010), pp. 1-3.

'Fresnel Lenses' downloaded from http://www.fresneltech.com on Jun. 8, 2011. Copyright Fresnel Technologies, Inc., 2003.

Azuma, R., et al., 'Recent advances in augmented reality', IEEE Computer Graphics App;. 21, 34-47 (2001).

Bajura, M., et al., "Merging virtual objects with the real world: seeing ultrasound imagery within the patient" in Proceedings of ACM SIGGRAPH (ACM, Chicago, 1992), pp. 203-210.

Biocca, et al., "Virtual eyes can rearrange your body: adapting to visual displacement in see-through, head-mounted displays", Presence: Teleoperators and Virtual Environments 7, 262-277 (1998).

Bunkenburg, J. 'Innovative Diffractive Eyepiece for Helmet-Mounted Display.' SPIE vol. 3430. pp. 41-49 Jul. 1998.

C. Curatu, H. Hua, and J. P. Rolland, "Projection-based headmounted display with eye-tracking capabilities," Proc. SPIE 5875, 587050J (2005).

Cakmakci, O., et al., 'Head-Worn Displays: A Review'. Journal of Display Technology, vol. 2, No. 3, Sep. 2006, pp. 199-216.

Caudell, T., et al., "Augmented reality: an application of heads-up display technology to manual manufacturing processes" in Proceedings of Hawaii International Conferences on Systems Sciences (Hawaii, 1992), pp. 659-669.

Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).

Examination Report dated Apr. 29, 2011 from corresponding GB Application No. GB1012165.5.

H. Hua, C. Gao, and J. P. Rolland, 'Study of the Imaging properties of retroreflective materials used in head-mounted projective displays (HMPDs),' Proc. SPIE4711, 194-201 (2002).

H. Hua, C. Gao, F. Biocca, and J. P. Rolland, "An ultra-light and compact design and implementation of head-mounted projective displays," in Proceedings of IEEE VR 2001, pp. 175-182.

H. Hua, L. Brown, and C. Gao, "A new collaborative infrastructure: SCAPE," in Proceedings of IEEE VR 2003 (IEEE, 2003), pp. 171-179.

H. Hua, L. Brown, and C. Gao, "SCAPE: supporting stereoscopic collaboration in augmented and projective environments," IEEE Comput. Graphics Appl. 24, 66-75 (2004).

(56) References Cited

OTHER PUBLICATIONS

H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al., 'Design of a Bright Polarized Head-Mounted Projection Display' Applied Optics 46:2600-2610 (2007).
International Search Report dated Mar. 9, 2009 with regard to International Patent Application No. PCT/US2009/031606.
J. L. Pezzaniti and R. A. Chipman, "Angular dependence of polarizing beam-splitter cubes," Appl. Opt. 33, 1916-1929 (1994).
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yanagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence' Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion of the International Searching Authority dated Mar. 9, 2009 with regard to International Patent Application No. PCT/US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
Zhang, R., et al., "Design of a Polarized Head-Mounted Projection Display using FLCOS Microdisplays", Proc. of SPIE vol. 6489, 64890B-1. (2007).
"OLED-XL Microdisplays," eMagin 5 pages (2010).
A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
A. Malmone, and H. Fuchs, "Computational augmented reality eyeglasses," Proc. of ISMAR 2012.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).
A. T. Duchowski, "Incorporating the viewer's Point-Of-Regard (POR) in gaze-contingent virtual environments", SPIE-Int. Soc. Opt. Eng. Proceedings of Spie—the International Society for Optical Engineering, vol. 3295, 1998, pp. 332-343.
Akeley et al., "A Stereo Display Prototype with Multiple Focal Distances," ACM Trans. Graphics 23:804-813 (2004).
Blundell, B. G., and Schwarz, A. J., "The classification of volumetric display systems: characteristics and predictability of the image space," IEEE Transaction on Visualization and Computer Graphics, 8(1), pp. 66-75, 2002.
C. B. Burckhardt, "Optimum parameters and resolution limitation of integral photography," J. Opt. Soc. Am. 58, 71-76 (1968).
C. Manh Do, et al., "Three-dimensional object-distortion-tolerant recognition for integral imaging using independent component analysis," Journal of Optical Society of America A 26, issue 2, pp. 245-251 (Feb. 1, 2009).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Christopher M. Bishop, Neural Networks for Pattern Recognition, Oxford University Press, Inc. New York, NY 1995.
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Duchowski, A., "Eyetracking Methodology: theory and practice," Publisher: Springer, 2003.
Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).

(56) References Cited

OTHER PUBLICATIONS

Edgar et al., "Visual Accommodation Problems with Head-Up and Helmet-Mounted Displays?," Displays 15:68-75 (1994).
European Search Report dated Aug. 14, 2015 in corresponding EP application 13740989.2.
F. Okano, H. Hoshino, J. Arai y I. Yuyama, "Real-time pickup method for a three-dimensional image based on integral photography," Appl. Opt. 36, 1598-1603 (1997).
Favalora et al., "100 Million-Voxel Volumetric Display," Proc. SPIE 4712:300-312 (2002).
G. Wetzstein et al., "Tensor Displays: Compressive light field synthesis using multilayer displays with directional backlighting," ACM Transactions on Graphics, 31(4), 2012.
GB Examination Report corresponding to GB 1012165.5 dated Jun. 28, 2011.
Geisler, W.S., J.S. Perry and J. Najemnik, "Visual search: The role of peripheral information measured using gaze-contingent displays," J. Vision 6, 858-873 (2006).
Graham-Rowe, "Liquid Lenses Make a Splash," Nature-Photonics pp. 2-4 (2006).
H. Hua, X. Hu, and C. Gao, "A high-resolution optical see-through head-mounted display with eyetracking capability," Optics Express, Nov. 2013.
H. Hua, "Sunglass-like displays become a reality with freeform optical technology," SPIE Newsroom, 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Heanue et al., "Volume Holographic Storage and Retrieval of Digital Data," Science 265:749-752 (1994).
Hidenori Kuriyabashi, Munekazu Date, Shiro Suyama, Toyohiko HatadaJ. of the SID 14/5, 2006 pp. 493-498.
Hua, "Merging the Worlds of Atoms and Bits: Augmented Virtual Environments," Optics and Photonics News 17:26-33 (2006).
Hua, H., C. Pansing, and J. P. Rolland, "Modeling of an eye-imaging system for optimizing illumination schemes in an eye-tracked head-mounted display," Applied Optics, 46(32): 1-14, Nov. 2007.
Hua, H. "Integration of eye tracking capability into optical see-through head-mounted displays," Proceedings of SPIE (Electronic Imaging 2001), pp. 496-503, Jan. 2001.
Hua et al., "Compact eyetracked optical see-through head-mounted display", Proc. SPIE 8288, Stereoscopic Displays and Applications XXIII, 82881F (Feb. 9, 2012).
Inoue et al., "Accommodative Responses to Stereoscopic Three-Dimensional Display," Applied Optics, 36:4509-4515 (1997).
International Search Report and Written Opinion dated Nov. 24, 2015 in corresponding PCT application PCT/US2015/047163.
International Search Report dated Feb. 10, 2011 from PCT/CN2010/072376.
International Search Report dated Jan. 29, 2014 in corresponding international application PCT/US2013/065422.
International Search Report dated Jun. 18, 2010 in corresponding international application PCT/US2010/031799.
J. Hong, S. Min, and B. Lee, "Integral floating display systems for augmented reality," Applixed Optics, 51(18):4201-9, 2012.
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).

J. Arai, et al., "Depth-control method for integral imaging," Feb. 1, 2008 / vol. 33, No. 3 / Optics Letters.
J. E. Melzer's: 'Overcoming the field-of- view/resolution invariant in head-mounted displays' Proc. SPIE vol. 3362, 1998, p. 284.
J. G. Droessler, D. J. Rotier, "Tilted cat helmet-mounted display," Opt. Eng., vol. 29, 849 (1990).
J. P. Rolland, "Wide-angle, off-axis, see-through head-mounted display," Opt. Eng., vol. 39, 1760 (2000).
J. S. Jang, F. Jin, and B. Javidi, "Three-dimensional integral imaging with large depth of focus by use of real and virtual image fields," Opt. Lett. 28:1421-23, 2003.
J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
Jisoo Hong, et al., "Three-dimensional display technologies of recent interest: Principles, Status, and Issues," Applied Optics (Dec. 1, 2011) 50(34):106.
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system: -evaluation experiments of a prototype system", Proceedings of 1994 IEEE International Conference on Systems, Man, and Cybernetics. Humans, Information and Technology (Cat. N0.94CH3571-5). IEEE. Part vol. 1, 1994, pp. 13-18 vol. 1. New York, NY, USA.
Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
L. G. Brown's: 'Applications of the Sensics panoramic HMD' SID Symposium Digest vol. 39, 2008, p. 77.
Laurence R. Young, David Sheena, "Survey of eye movement recording methods", Behavior Research Methods & Instrumentation, 7(5), 397-429, 1975.
Liu et al., 'A Novel Prototype for an Optical See-Through Head-Mounted Display with Addressable Focus Cues,' IEEE Transactions on Visualization and Computer Graphics 16:381-393 (2010).
Liu et al., "A Systematic Method for Designing Depth-Fused Multi-Focal Plane Three-Dimensional Displays," Optics Express 18:11562-11573 (2010).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Loschky, L.C. and Wolverton, G.S., "How late can you update gaze-contingent multiresolutional displays without detection?" ACM Trans. Mult. Comp. Comm, and App. 3, Nov. 2007.
Love et al. (High Speed switchable lens enables the development of a volumetric stereoscopic display. Aug. 2009, Optics Express. vol. 17, No. 18, pp. 15716-15725.).
M. Marti-nez-Corral, et al., "Full parallax 3-D TV with programmable display parameters," Opt. Phot. News 22, 50-50 (2011).
M. D. Missig and G. M. Morris, "Diffractive optics applied to eyepiece design," Appl. Opt. 34, 2452-2461 (1995).
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
M. Gutin: 'Automated design and fabrication of ocular optics' Proc. SPIE 2008, p. 7060.
M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
M. Lucente, "Interactive three-dimensional holographic displays: seeing the future in depth," Computer Graphics, 31(2), pp. 63-67, 1997.

(56) References Cited

OTHER PUBLICATIONS

McQuaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
O. Cakmakci, B. Moore, H. Foroosh, and J. P. Rolland, "Optimal local shape description for rotationally non-symmetric optical surface design and analysis," Opt. Express 16, 1583-1589 (2008).
Optical Research Associates, http://www.optica1res.com, 2 pages (obtained Jan. 26, 2011).
P. A. Blanche, et al., "Holographic three-dimensional telepresence using large-area photorefractive polymer", Nature, 468, 80-83, Nov. 2010.
P. Gabbur, H. Hua, and K. Barnard, 'A fast connected components labeling algorithm for real-time pupil detection,' Mach. Vision Appl., 21(5):779-787, 2010.
"Enhanced viewing-angle integral imaging by multiple-axis telecentric relay system," Optics Express, vol. 15, Issue 24, pp. 16255-16260, Nov. 21, 2007.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
R. Schulein, M. DaneshPanah, and B. Javidi, "3D imaging with axially distributed sensing," Journal of Optics Letters, vol. 34, Issue 13, pp. 2012-2014, Jul. 1, 2009.
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Rolland et al., "Multifocal Planes Head-Mounted Displays," Applied Optics 39:3209-3215 (2000).
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.
S. Hong and B. Javidi, "Distortion-tolerant 3D recognition of occluded objects using computational integral imaging," Journal of Optics Express, vol. 14, Issue 25, pp. 12085-12095, Dec. 11, 2006.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
Schowengerdt, B. T., and Seibel, E. J., "True 3-D scanned voxel displays using single or multiple light sources," Journal of SID, 14(2), pp. 135-143, 2006.
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction forthe Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).

Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
T. Okoshi, "Optimum design and depth resolution of lens-sheet and projection-type three-dimensional displays," Appl. Opt. 10, 2284-2291 (1971).
T. Ando, K. Yamasaki, M. Okamoto, and E. Shimizu, "Head Mounted Display using holographic optical element," Proc. SPIE, vol. 3293, 183 (1998).
Tibor Balogh, "The HoloVizio System," Proceedings of SPIE, vol. 6055, 2006.
Varioptic, "Video Auto Focus and Optical Image Stabilization," http://www.varioptic.com/en/home.html, 2 pages (2008).
Wann et al., Natural Problems for Stereoscopic Depth Perception in Virtual Environments, Vision Res. 35:2731-2736 (1995).
Wartenberg, Philipp, "EyeCatcher, the Bi-directional OLED Microdisplay," Proc. of SID 2011.
Watt et al., "Focus Cues Affect Perceived Depth," J Vision 5:834-862 (2005).
Written Opinion dated Feb. 10, 2011 from PCT/CN2010/072376.
Written Opinion dated Jun. 18, 2010 in corresponding international application PCT/US2010/031799.
X. Hu and H. Hua, "Design and assessment of a depth-fused multi-focal-plane display prototype," Journal of Display Technology, Dec. 2013.
Xiao Xiao, Bahram Javidi, Manuel Martinez-Corral, and Adrian Stern , "Advances in Three-Dimensional Integral Imaging: Sensing, Display, and Applications," Applied Optics, 52(4):. 546-560,2013.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
Xinda Hu and Hong Hua, "High-resolution optical see-through multi-focal-plane head-mounted display using freeform optics," Optics Express,22(11): 13896-13903, Jun. 2014.
Y. Takaki, Y. Urano, S. Kashiwada, H. Ando, and K. Nakamura, "Super multi-view winshield display for long-distance image information presentation," Opt. Express, 19, 704-16, 2011.
Yamazaki et al., "Thin wide-field-of-view HMD with free-form-surface prism and applications", Proc. SPIE 3639, Stereoscopic Displays and Virtual Reality Systems VI, 453 (May 24, 1999).
Yano, S., Emoto, M., Mitsuhashi, T., and Thwaites, H., "A study of visual fatigue and visual comfort for 3D HDTV/HDTV images," Displays, 23(4), pp. 191-201, 2002.
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.
X. Hu and H. Hua, "Design and tolerance of a free-form optical system for an optical see-hrough multi-focal-plane display," Applied Optics, 54(33): 9990-9, 2015.
A. Yabe, "Representation of freeform surface suitable for optimization," Applied Optics, 2012.

(56) References Cited

OTHER PUBLICATIONS

Armitage, David, Ian Underwood, and Shin-Tson Wu. Introduction to Microdisplays. Chichester, England: Wiley, 2006.
European Search Report dated Apr. 28, 2016 from EP application 13847218.8.
Hoshi, et al., "Off-axial HMD optical system consisting of aspherical surfaces without rotational symmetry," Proc. SPIE 2653, Stereoscopic Displays and Virtual Reality Systems III, 234 (Apr. 10, 1996).
Hu and Hua, "Design and tolerance of a freeform optical system for an optical see-through multi-focal plane display," Applied Optics, 2015.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Dewen Cheng et al.; "Large field-of-view and high resolution free-form head-mounted display"; SPIE-OSA/vol. 7652 Jun. 2018.
G. Lippmann, "Epreuves reversibles donnant la sensation du relief," Journal of Physics (Paris) 7, 821-825 (1908).
Huang et al., "An integral-imaging-based head-mounted light field display using a tunable lens,;and aperture array." Journal of the Society for Information Display Mar. 1, 2017; p. 199-201.

\* cited by examiner

OPTICAL SEE-THROUGH FREE-FORM HEAD-MOUNTED DISPLAY

RELATED APPLICATIONS

This is a continuation application of U.S. application Ser. No. 14/956,632, filed Dec. 2, 2015, which is a continuation application of U.S. application Ser. No. 14/010,956, filed Aug. 27, 2013, now U.S. Pat. No. 9,239,453, which is a continuation of U.S. application Ser. No. 13/318,864, filed Nov. 4, 2011, which is a National Stage application under 35 U.S.C. 371 (c) of PCT/US10/31799, filed Apr. 20, 2010, which in turn claims the benefit of priority of U.S. Provisional Application No. 61/214,117, filed on Apr. 20, 2009, the entire contents of which applications are incorporated herein by reference.

GOVERNMENT RIGHTS

This invention was made with government support under contract numbers 0644446 awarded by the U.S. National Science Foundation, 60827003 awarded by the National Natural Science Foundation of China, and 2009AA01Z308 awarded by the Hi-Tech Research and Development Program of China. The U.S. and Chinese governments have certain rights in the invention.

FIELD OF THE INVENTION

The present invention relates generally to a see-through free-form head-mounted display, and more particularly, but not exclusively to a wedge-shaped prism-lens having free-form surfaces configured to provide a low F-number heretofore unachieved.

BACKGROUND

Optical see-through head-mounted displays (OST-HMD) find myriads of applications from scientific visualization to defense applications, from medical visualization to engineering processes, and from training to entertainment. In mixed or augmented reality systems, OST-HMDs have been one of the basic vehicles for combining computer-generated virtual scene with the views of a real-world scene. Typically through an optical combiner, an OST-HMD maintains a direct view of the physical world and optically superimposes computer-generated images onto the real scene. Compared with a video see-though approach where the real-world views are captured through cameras, it has the advantage of introducing minimal degradation to the real world scene. Therefore an OST-HMD is preferred for applications where a non-blocked real-world view is critical.

On the other hand, designing a wide field of view (FOV), low F-number, compact, and nonintrusive OST-HMD has been a great challenge, especially difficult for a non-pupil forming system. The typical eyepiece structure using rotationally symmetric components has limitations in achieving low F-number, large eye relief, and wide FOV. Many methods have been explored to achieve an HMD optical system which fulfils the above mentioned requirements. These methods include applying catadioptric techniques, introducing new elements such as aspherical surfaces, holographic and diffractive optical components, exploring new design principles such as using projection optics to replace an eyepiece or microscope type lens system in a conventional HMD design, and introducing tilt and decenter or even free-form surfaces. (H. Hoshi, et. al, "Off-axial HMD optical system consisting of aspherical surfaces without rotational symmetry," SPIE Vol. 2653, 234 (1996). S. Yamazaki, et al., "Thin wide-field-of-view HMD with free-form-surface prism and applications," Proc. SPIE, Vol. 3639, 453 (1999).)

Among the different methods mentioned above, free-form surfaces demonstrate great promise in designing compact HMD systems, In particular, a wedge-shaped free-form prism, introduced by Morishima et al. (Morishima et al., "The design of off-axial optical system consisting of aspherical mirrors without rotational symmetry," 20th Optical Symposium, Extended Abstracts, 21, pp. 53-56 (1995)), takes the advantage of total internal reflection (TIR), which helps minimize light loss and improve the brightness and contrast of the displayed images when compared with designs using half mirrors. It is challenging, however, to design a free-form prism based OST-HMD offering a wide FOV, low F-number, and sufficient eye relief.

The concept of free-form HMD designs with a wedge-shaped prism was first presented by Morishima et al. in 1995, and the fabrication and evaluation method were explored by Inoguchi et al. ("Fabrication and evaluation of HMD optical system consisting of aspherical mirrors without rotation symmetry," *Japan Optics '95, Extended Abstracts*, 20pB06, pp. 19-20, 1995). Following these pioneering efforts, many attempts have been made to design HMDs using free-form surfaces, particularly designs based on a wedge-shaped prism (U.S. Pat. Nos. 5,699,194, 5,701, 202, 5,706,136. D. Cheng, et al., "Design of a lightweight and wide field-of-view HMD system with free form surface prism," Infrared and Laser Engineering, Vol. 36, 3 (2007)). For instance, Hoshi et al. presented an FFS prism offering an FOV of 34° and a thickness of 15 mm; Yamazaki et al. described a 51° OST-HMD design consisting of a FFS prism and an auxiliary lens attached to the FFS prism; and more recently Cakmakci et al. designed a 20° HMD system with one free-form reflecting surface which was based on rational radial basis function and a diffractive lens. ("Optimal local shape description for rotationally non-symmetric optical surface design and analysis," Opt. Express 16, 1583-1589 (2008)). There are also several commercially available HMD products based on the FFS prism concept. For instance, Olympus released their Eye-Trek series of HMDs based on free-form prisms. Emagin carried Z800 with the optical module WFO5, Daeyang carried i-Visor FX series (GEOMC module, A3 prism) products; Rockwell Collins announced the ProView SL40 using the prism technology of OEM display optics.

Existing FFS-based designs have an exit pupil diameter that is typically from 4 to 8 mm with a FOV typically around 40 degrees or less. In most of the existing designs, the size of the microdisplays is in the range of 1 to 1.3 inches, which affords a focal length of 35~45 mm for a typical 40-degree FOV. Even with an exit pupil up to 8 mm, the F/#remains fairly high (greater than 4) and eases the optical design challenge. A large size microdisplay, however, offsets the advantage of compactness using a free-form prism. In the more recent designs, smaller microdisplays, typically around 0.6", were adopted, which requires a focal length of ~21 mm to achieve a 40-degree FOV. The reduced focal length makes it very challenging to design a system with a large exit pupil. As a result, most of the designs compromise the exit pupil diameter. Thus, commercially available products on average reduce the pupil diameter to about 3~5 mm to maintain an F/#greater than 4. There are a few designs that achieve a larger pupil by introducing additional free-form elements or diffractive optical elements. For instance, Droessler and Fritz described the design of a high brightness see-through head-mounted system with an F/# as low as 1.7 by using two extra decentered lenses and applying one diffractive surface. (U.S. Pat. No. 6,147,807). The existing work shows that it is extremely difficult to achieve a very fast (low F/#) and wide field of view HMD design with a single wedge-shaped free-form surface prism.

Accordingly, it would be an advance in the field of optical see-through head-mounted displays to provide a head-mounted display which has a wide field of view and low F/#, while also providing a compact, light-weight, and nonintrusive form factor.

SUMMARY OF THE DISCLOSURE

In one of its aspects, the present invention provides a free-form prism-lens for use in an optical see-through head-mounted display. The prism-lens may include a first free-form surface configured to receive light from a micro-display and configured to transmit the received light into the body of the prism-lens, and a second free-form surface configured to receive the light transmitted into the body of the prism-lens from the first free-form surface and configured to totally internally reflect the received light at the second surface. In addition, prism-lens may also include a third free-form surface configured to receive the light reflected by the second free-form surface and configured to reflect the light out of the prism-lens and may have an f-number less than 3.5. The prism-lens may optionally include an auxiliary lens disposed proximate the third free-form surface. The auxiliary lens may be configured to minimize the shift and distortion of rays from a real-world scene by the second and third surfaces of the prism-lens.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION

Figure 1:
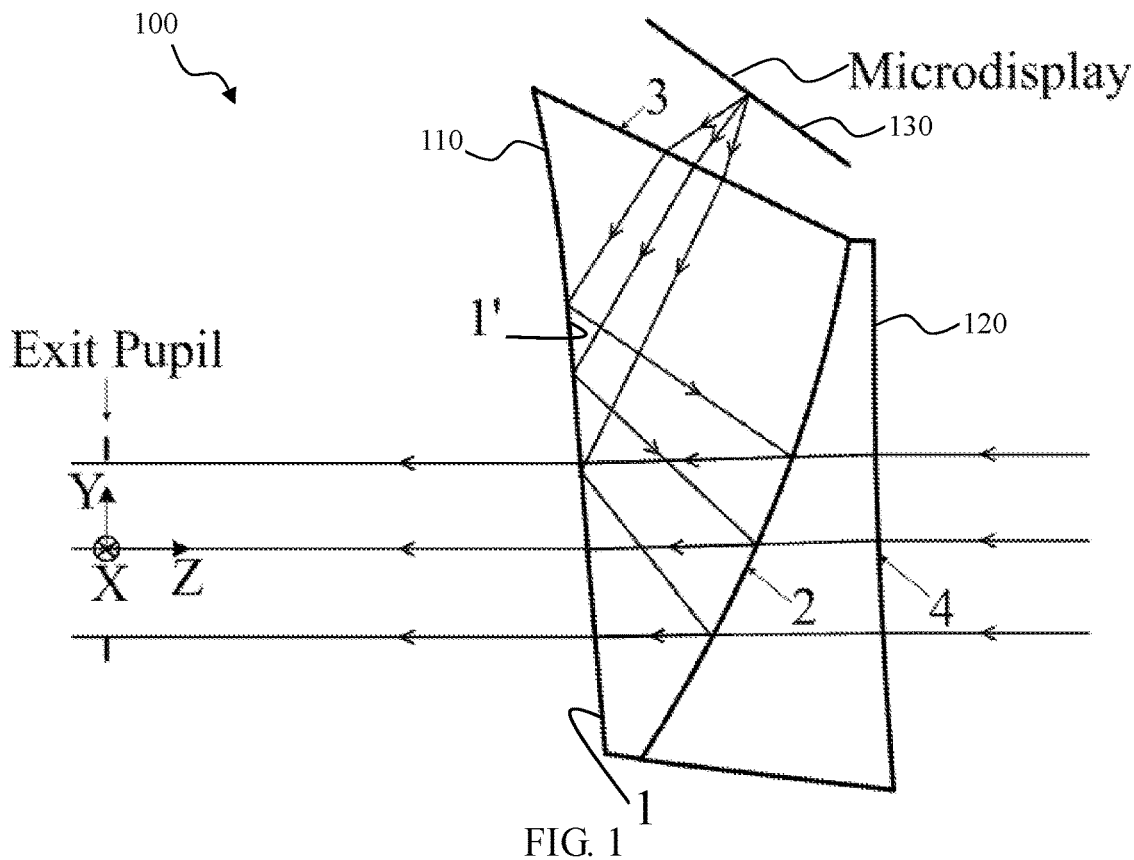
FIG. 1 schematically illustrates a layout of an exemplary optical see-through head-mounted display system in accordance with the present invention.

The desire to achieve an optical see-through head-mounted display having a compact, light-weight, and non-intrusive form factor argues for a design having as few optical elements as possible. Accordingly, exemplary designs of the present invention provide a single-element prism-lens 110, 710 which has sufficient optical power on its own to deliver light from a micro-display 130 to a user, FIGS. 1, 6. However, providing a single optical element, such as the prism-lens 710, in which all the optical power resides can lead to greatly increased aberrations with accompanying loss in resolution and image quality, especially for low F/# systems. Despite these challenges, as a result of the lens design procedures and work described below, the present invention provides a single-element prism-lens 710 based on a 0.61" microdisplay 130, which offers a diagonal FOV of 53.5°, an F/# of 1.875, an exit pupil diameter of 8 mm, and an eye relief of 18.25 mm. In addition, in order to maintain a non-distorted see-through view of a real-world scene, a cemented auxiliary lens 120, 720 may be provided for use in conjunction with the prism-lens 110, 710.

Display System Specifications

Turning first to the design of the wedge-shaped free-form prism-lens 110, design began with development of the display system specifications. An optical see-through HMD 100 typically consists of an optical path for viewing a displayed virtual image and a path for viewing a real-world scene directly. As shown in FIG. 1, the optical system 100 of our OST-HMD design may include a wedge-shaped free-form prism-lens 110 cemented to an auxiliary free-form lens 120. The prism-lens 110 serves as the near-eye viewing optics that magnifies the image displayed through a micro-display 130 while the auxiliary free-form lens 120 is an auxiliary element attached to the prism-lens 110 in order to maintain a non-distorted see-through view of a real-world scene.

As shown in FIG. 1, the wedge shaped free-form prism-lens 110 may include three surfaces labeled as 1, 2, and 3, respectively. For the sake of convenience, the surface adjacent to the exit pupil is labeled as 1 in the refraction path and as 1' in the reflection path. We set the center of the exit pupil as the origin of the global coordinate system and the rest of the surfaces were specified with respect to this global reference. We further adopted the convention of tracing the system backward, namely from the eye position to the microdisplay 130.

The overall system was set to be symmetric about the YOZ plane, but not the XOZ plane. A ray emitted from a point on the microdisplay 130 is first refracted by the surface 3 next to the microdisplay 130. After two consecutive reflections by the surfaces 1' and 2, the ray is transmitted through the surface 1 and reaches the exit pupil of the system 100. The first surface (i.e., 1 and 1') of the prism-lens 110 is required to satisfy the condition of total internal reflection for rays reflected by this surface 1'. The rear surface 2 of the prism-lens 110 is coated as a half mirror in order to facilitate the optical see-through capability. The rays from the microdisplay 130 will be reflected by the rear surface 2 while the rays from a real-world scene will be transmitted. An auxiliary lens 120 may be cemented to the wedge-shaped prism-lens 110 in order to counteract the ray shift and distortion caused by the prism-lens 110. The front surface of the auxiliary free-form lens 120 may match the shape of the rear surface 2 of the prism-lens 110. The back surface 4 of the auxiliary free-form lens 120 may be optimized to minimize the shift and distortion introduced to the rays from a real-world scene when the auxiliary free-form lens 120 is combined with the prism-lens 110.

TABLE 1

Specifications of FFS Prism-lens HMD System

| Parameter | Specification |
|---|---|
| LCD | |
| Size | 0.61 in (15.5 mm) diagonally |
| Active display area | 12.7 mm × 9.0 mm |
| Resolution | 800 × 600 pixels |
| Virtual imaging system | |
| Type | folded FFS prism-lens |
| Effective focal length | 15 mm |
| Exit pupil diameter | 8 mm |
| Eye relief | >17 (18.25) mm |
| F/# | 1.875 |
| Number of free-form surfaces | 3 |
| Augmented viewing system | |
| Type | Free-form lens |
| Number of free-form surfaces | 2 |
| Other parameters | |
| Wavelength | 656.3-486.1 nm |
| Field of view | 45° H × 32° V |
| Vignetting | 0.15 for top and bottom fields |
| Distortion | <12% at the maximum field |
| Image quality | MTF >10% at 30 lps/mm |

The overall specifications of the system are summarized in Table 1. Our goal was to achieve a very compact, lightweight, and wide FOV design using a wedge-shaped free-form prism-lens 110. A small size microdisplay 130 with high resolution was thus preferred. Based on the size, resolution, availability and cost, a pair of 0.61-inch Emagin OLED displays were selected, with a resolution of 800×600 pixels and a 15 µm pixel size. We further targeted an HMD system 100 with a diagonal full FOV of at least 50°, which corresponds to a focal length no more than 16.6 mm. A 15 mm focal length was selected, which offers a reasonable balance between FOV (53.5° diagonally) and angular resolution (3.2 arc minutes per pixel). In the design of visual instruments, especially binocular HMDs, a large exit pupil is typically preferred to account for the swiveling of the eyes in their sockets without causing vignetting or loss of image. A large pupil offers better tolerance of the interpupilary distances (IPD) among different users without the need to mechanically adjust the IPD of the binocular optics. A large pupil, however, often not only compromises the compactness and weight of the optical system 100, but also imposes limitations on the FOV due to the dramatically increased challenge of designing low F/#systems. Taking into account these factors, we set the exit pupil diameter to be 8 mm, which leads to a system 100 with a F/ #of 1.875. In designing HMD systems, a large eye relief is desired to accommodate users wearing eyeglasses, but it affects the compactness of the viewing optics. A minimum of a 18 mm eye relief was set to accommodate users wearing low-profile eyeglasses. Balancing between image uniformity and system compactness, we set the limit of the vignetting to be less than 15% at the top and bottom of the visual fields.

Among the aberrations of an optical system, distortion causes the warping of the displayed image without reducing image sharpness, which allows computational or electronic correction. In designing conventional HMDs it is common to optimize the system 100 to minimize the optical aberrations that reduce image quality and cannot be compensated electronically or computationally. In a free-form optical system 100, however, the distortion can be very large and irregular if it is left without any constraints. We thus set a distortion limit of 12% at the maximum field angle and planned to correct the residual distortion using computational methods. In terms of other types of aberrations, the modulation transfer function (MTF) was selected to evaluate the overall image sharpness and was set to be no less than 10% across the entire visual field at a spatial frequency of 30 lps/mm. With the specifications established, development continued with design of the free-form elements 110, 120.

Design of Free-Form Elements

Free-form optical surfaces offer more degrees of freedom to optical designers than conventional rotationally symmetric optical surfaces, such as a spherical or aspherical surface, and achieve usually lower wavefront errors and distortion than that achievable with the same number of rotationally symmetric surfaces. A significant benefit in our OST-HMD design lies in its ability to yield display optics with an eyeglass-like form factor. An optical design using free-form surfaces, however, may cause a dramatic increase in the complexity of the design and optimization process. An inadequate method of representing and optimizing a free-form surface may lead to discouraging and unpredictable results. Key issues in the process of designing a FFS HMD include 1) a free-form surface representation and design strategy; 2) total internal reflection condition; and 3) structure constraints to form a valid prism-lens 110.

Free-Form Surface Representation and Design Strategy

Selecting a suitable method for a free-form surface representation is very important. Different representation methods not only have different impacts on the ray tracing speed and the convergence of optimization, but also offer different degrees of design freedom. A suitable representation method shall 1) provide adequate degrees of freedom; 2) require a reasonable amount of ray tracing time; and 3) offer reliable convergence in the optimization process. Ray tracing speed is a particular concern in designing a free-form prism-lens 110, as a larger number of fields need to be sampled when optimizing a free-form optical system than need to be sampled in a rotationally symmetrical optical system. Speed becomes a more serious problem when a global optimization is necessary. Although most of the commercially available optical design software, such as CODE V® (Optical Research Associates, Pasadena, Calif.), offers the ability to model free-form surfaces in user-defined methods, the ray tracing speed of user-defined representations typically is much slower than the standard methods available in the software packages.

By taking into account the speed and convergence factors, the following design strategy was adopted in our design process. In the case when we lacked a starting point for an FFS surface, we started to optimize the surface with a spherical type to obtain the correct first-order parameters. The spherical surface was then converted to an aspheric type by adding a conic constant and a $4^{th}$ order or higher aspheric coefficients. Following an intermediate state of optimization, the ASP-type surface was then converted to an AAS-type surface for better correction by directly adding asymmetric coefficients up to the $10^{th}$ order. To avoid loss of information, use of aspheric terms higher than the $10^{th}$ order was not pursued, because the AAS surface has only up to the $10^{th}$ order of rotationally symmetric coefficients in CODE V®. Optimization with the AAS type surface helped to create a good starting point. The AAS surface was then converted to the XYP-type through a fitting algorithm (e.g., a least square fitting method) for final stage of optimization. High precision was required for the fitting algorithm to avoid a significant deviation from the starting design produced by the AAS surface type.

Total Internal Reflection Constraint

As mentioned above, all the rays striking the first surface 1' of the prism-lens 110 from inside should be totally reflected off. The first surface 1' cannot be coated with a reflective film, because it is shared by both a refractive and reflective path of the same rays. Therefore, the incident angles of all the rays striking the first surface 1' from the microdisplay 130 should be larger than the critical angle, $\theta_c$, set by the TIR condition $$\theta_c = \arcsin(1/n) \quad (1)$$

where n is the refractive index of the material for the FFS prism-lens 110. For example, if the index of the material is equal to 1.5, all the incident angles should be larger than 41.82°. Rays incident on the first surface 1' of the prism-lens 110 at a smaller angle may be transmitted through the prism-lens 110 without the benefit of reflection off the rear surface 2 (and subsequent refraction at the first surface 1) and may directly enter the eye, which leads to stray light and a reduction in the image contrast observed by the user. If the TIR condition is met, however, after two consecutive reflections by the front and rear surfaces 1' and 2, respectively, the same ray is returned back and to be transmitted through the front surface 1. To ensure transmission of the ray after the two consecutive reflections, the incident angle of the ray should be smaller than the critical angle set by Eqn. (1) to avoid the TIR effect.

Figure 3:
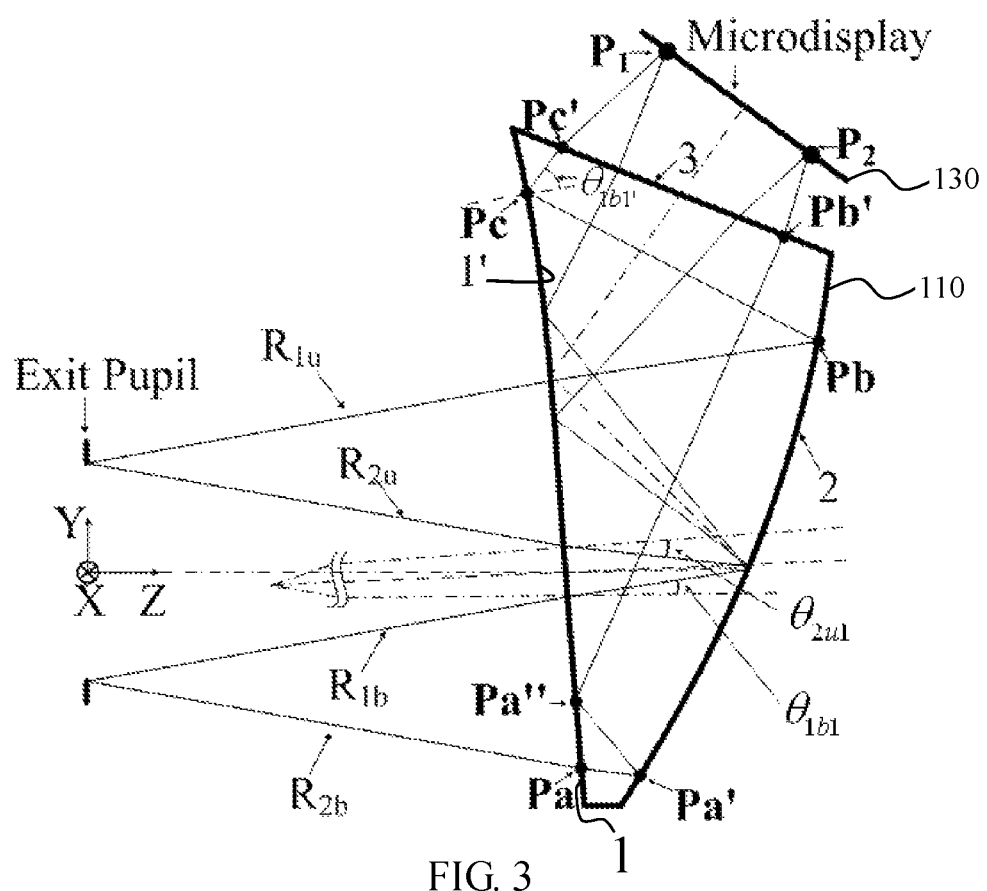
FIG. 3 schematically illustrates the optical paths of the rays of different object fields and different pupil positions in an exemplary free-form-surface prism-lens see-through head-mounted display, with the incident angles of the rays on surfaces 1 and 1' depending on their field and pupil positions and controlled to satisfy TIR conditions and avoid stray light.

It was impractical to constrain the incident angle of every ray incident on the surface of interest during the optimization process. An adequate and practical control method was required. Without loss of generality, we made two assumptions: (1) the local departure of the surface 1' from a spherical surface was sufficiently small compared to the primary radius of curvature of the surface so that the surface normal of every point on surface 1' could be adequately approximated by a line passing through to the center of the primary curvature of the surface (as shown in FIG. 3); and (2) the primary curvature of the surface 1 is concave, as shown in FIG. 3. Under these assumptions, we could prove that the top marginal ray, $R_{1u}$, which corresponds to the ray from the maximum object field in the positive Y-direction (i.e. $P_1$) passing through the top edge of the pupil, had the smallest incident angle among all the rays striking the surface 1' from the microdisplay 130 side. As shown in FIG. 3, the incident angle on surface 1' increased gradually as the ray from the same object field shifted from the top to the bottom of the pupil (e.g. from $R_{1u}$ to $R_{1b}$); the angle also increased as the ray intersecting the same pupil position shifted from the top to the bottom of the object fields (e.g., from $R_{1u}$ to $R_{2u}$). Therefore, the constraint on the incident angle was written as $$\theta_{1b1} > \arcsin(1/n) \quad (2)$$

where $\theta_{1b1}$ is the incident angle of the top marginal ray, $R_{1b}$, on surface 1' from the maximum object field in tangential plane of the microdisplay 130.

We could further prove that after the two consecutive reflections the top marginal ray, $R_{2u}$, of the maximum object field in the negative Y-direction (i.e. $P_2$) had the largest incident angle on the surface 1 when the surface 1 was tilted counterclockwise about the X-axis (i.e., the tilt angle, $\theta_1 > 0$); otherwise the bottom marginal ray $R_{1b}$, of the maximum object field in the positive Y-direction ($P_1$) has the largest incident angle when the surface 1 was tilted clockwise. Therefore, the constraint used to avoid TIR condition on surface 1 was written as:

$$\theta_{1b} = \begin{cases} \theta_{1b1} < \arcsin(1/n), & \theta_1 \leq 0 \\ \theta_{2u1} < \arcsin(1/n), & \theta_1 \geq 0 \end{cases} \quad (3)$$

where $\theta_{1b1}$ is the incident angle of the bottom marginal ray, $R_{1b}$, striking the surface 1; and $\theta_{2u1}$ is the incident angle of the top marginal ray, $R_{2u}$, on surface 1, and $\theta_1$ is the tilt angle of surface 1 about the X-axis.

The simplified constraints in Eqns. (2) and (3) were important in making the optimization practical in designing the FFS prism-lens 110. Increasing the refractive index of the material could help to relax the ray angle constraints and ease the design task. However, high refractive index materials can increase the color aberrations (due to lower Abbe number) and fabrication cost. Furthermore, our goal in this design was to achieve light weight by using plastic materials, which usually have a moderately low range of refractive indices.

Structure Constraints

Designing the wedge-shaped free-form prism-lens 110 required optimizing the shapes of individual surfaces to minimize wavefront errors under the ray angle constraints set by Eqns. 2 and 3. It further required additional structure constraints in order to ensure that the three surfaces together formed a valid prism-lens shape, that all the rays across the fields could be traced without obstruction or early escaping from a surface, and that the prism-lens 110 maintained desirable center and edge thickness. FIG. 3 illustrates the structure control method we employed. During each step of the optimization, we traced two rays: the top marginal ray, $R_{1u}$, of the maximum field in the positive Y-direction and the bottom marginal ray, $R_{2b}$, of the maximum field in the negative Y-direction. As shown in FIG. 3, $P_a$, $P_a'$, $P_a''$ and $P_b'$ denote the intersection points of the ray $R_{2b}$ with surfaces 1, 2, 1' and 3, respectively; and $P_b$, $P_c$ and $P_c'$ label the intersection points of the ray $R_{1u}$ with surfaces 2, 1' and 3, respectively. The coordinates of these ray-surface intersections were then used to define the constraints for optimizing the FFS HMD prism-lens 110. Based on the requirements of the physical structure, the constraints were defined as $$\begin{cases} Y_{Pa'} - Y_{Pa} < 0 \\ Y_{Pa''} - Y_{Pa} > 0 \\ 0.5 < Z_{Pa'} - Z_{Pa} < 2 \end{cases} \quad (4)$$

$$\begin{cases} Y_{Pb'} - Y_{Pb} > 0 \\ -1.5 < Z_{Pb'} - Z_{Pb} < -0.2 \end{cases} \quad (5)$$

$$\begin{cases} -2 < Y_{Pc} - Y_{Pc'} \leq 0 \\ 0 < Z_{Pc} - Z_{Pc'} < 1 \end{cases} \quad (6)$$

$$\begin{cases} Z_{pa} \geq \text{the eye clearance distance, i.e., 17} \\ Z_{pc} \geq \text{the eye clearance distance, i.e., 17} \end{cases} \quad (7)$$

where all the Y, Z coordinates in the equations are referenced to the global coordinate system with the origin located at the center of the exit pupil.

Here by constraining the Y coordinates of the points $P_a$, $P_a'$, and $P_a''$, Eqn. (4) ensured that the surfaces 1 and 2 intersected properly so that the bottom marginal ray could be traced through the prism-lens 110 without obstruction. Equation 4 further set the upper and lower limits (e.g. 2 and 0.5 mm, respectively) on the edge thickness of the prism-lens 110 by constraining the Z coordinates of the points $P_a$ and $P_a'$. By constraining the Y and Z coordinates of the points $P_b$ and $P_b'$, Eqn. (5) avoided the escape of the top marginal ray after reflection by the surface 1 and helped to control the thickness of the prism-lens 110. By controlling the Y and Z coordinates of the points $P_c$ and $P_c'$, Eqn. (6) ensured that the surfaces 1 and 3 intersected properly so that the top marginal ray could be traced through the prism-lens 110 without obstruction or escaping from the prism-lens 110. It further helped control the height of the prism-lens 110. Eqns. 4 through 6 together ensured the three surfaces formed a valid prism-lens shape. These relationships further set limits on the tilt angles of the surfaces 1 and 2, which helped to limit the off axis aberrations. By limiting the Z coordinates of the points $P_a$ and $P_c$, Eqn. (7) set the minimal value for the eye clearance distance.

Optimization of the Free-Form Prism

We selected a patented design by Takahashi (U.S. Pat. No. 5,959,780) as a starting point. The original prism design of Takahashi included two free-form surfaces 501, 502 and one planar surface 503. Based on a 1.3 inch microdisplay 530, the Takahashi design offered a full FOV of the system 500 of 57.8°×34.6°, with an exit pupil diameter of 4 mm and effective focal length of about 27.4 mm. The F/ # of the system 500 was only 6.85. To meet our specifications, we scaled the effective focal length to 15 mm, reduced the horizontal FOV to 45°, and increased the exit pupil diameter from 4 mm to 8 mm, yielding a system 500 with an F/ # of 1.875. In the scaled system 500, the eye relief was reduced to 15.5 mm. The significantly reduced F/# imposed a critical challenge on system performance and invalidated several critical conditions of the prism-lens structure.

Figure 4A:
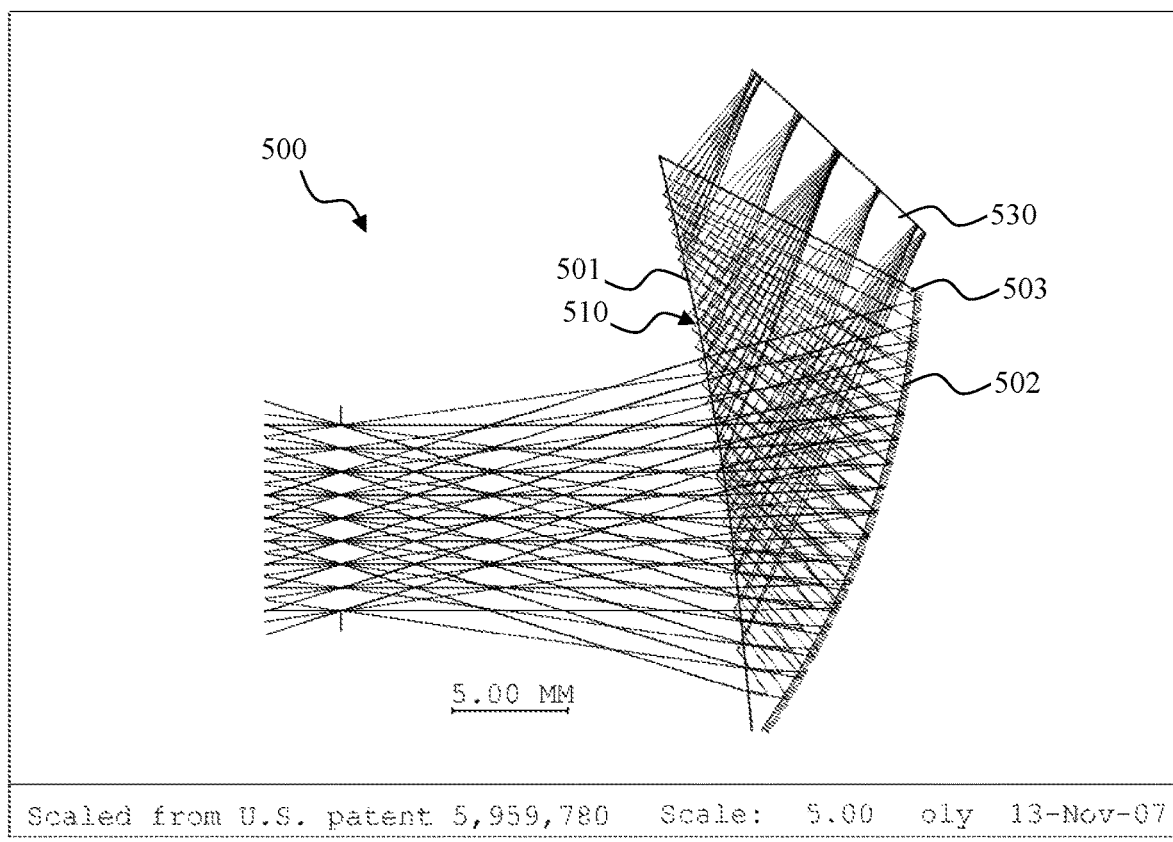
FIGS. 4A-4D schematically illustrate a starting point for an exemplary design of the present invention, with FIG. 4A showing the optical layout in the YZ plane, FIG. 4B showing MTF plots, FIG. 4C showing ray fan plots of center fields, and FIG. 4D showing ray fan plots of marginal fields.
Figure 4B:
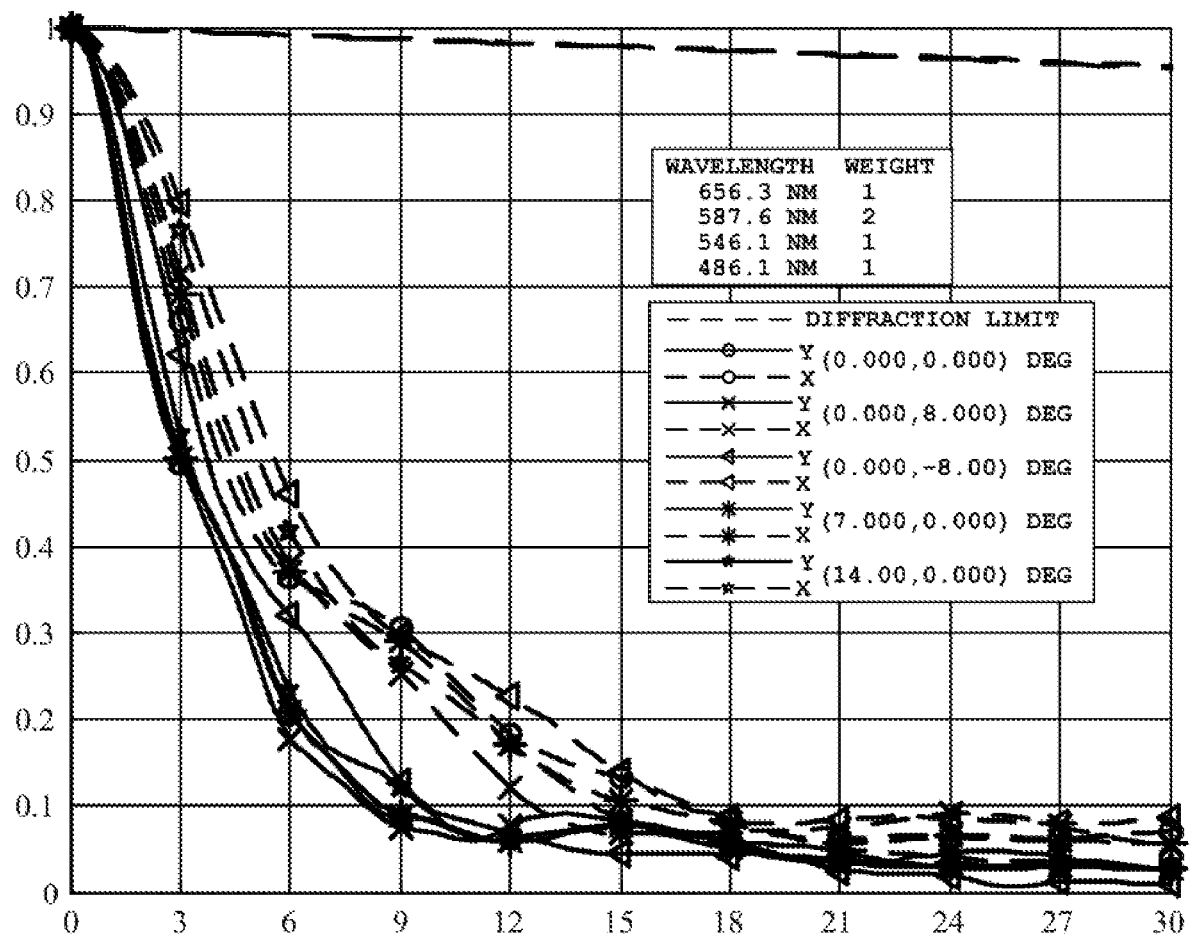
Figure 4C:
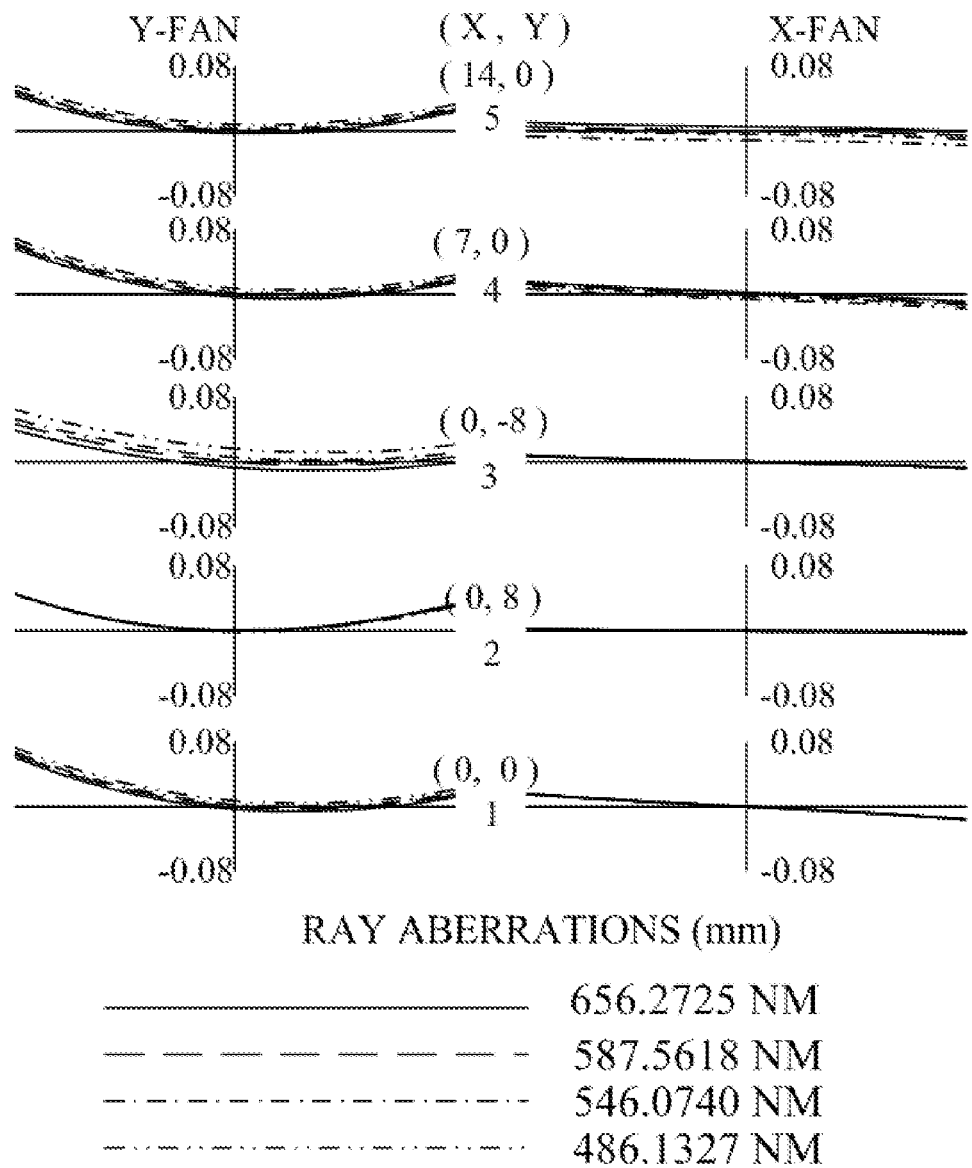
Figure 4D:
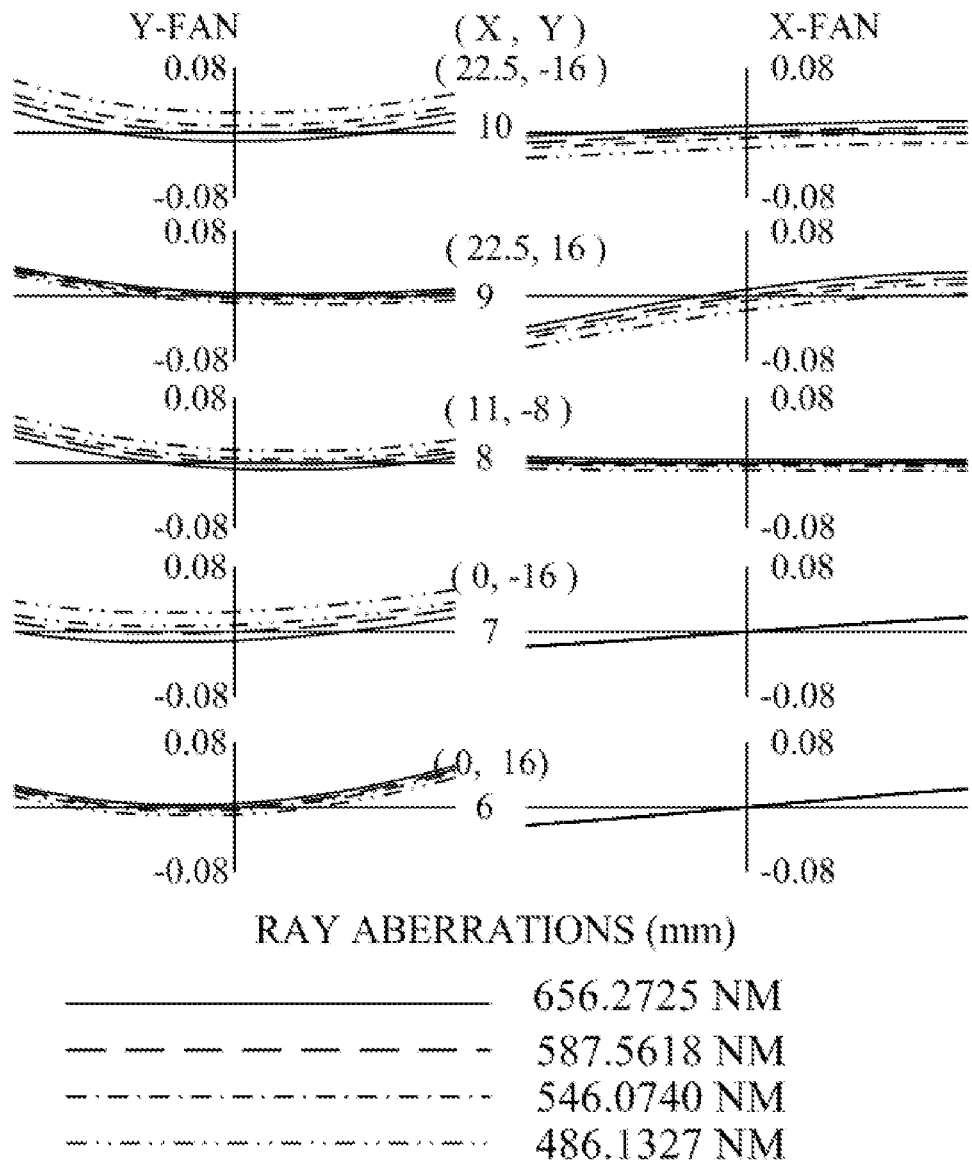

For instance, the incident angles of the rays on the TIR surface 501 were far smaller than the critical angle and a part of the rays from the top and bottom fields escaped from the prism 510 before completing their paths. We thus had to set considerably large vignetting for the top and bottom fields to obtain a valid starting design. FIGS. 4A and 4B show the layout and the polychromatic MTF plots of the scaled starting system 500, respectively. The MTF of the starting design was evaluated at an exit pupil diameter of 8 mm with vignetting, was no higher than 0.1 at a spatial frequency of 10 lps/mm across the entire visual field. The rayfan plots were evaluated at a 3 mm pupil, shown in FIGS. 4C and 4D. We thus needed a better starting point that met our first-order specifications before performing a comprehensive optimization.

The system of FIGS. 4A-4D was optimized with rays traced from the eye position to the microdisplay 530 in CODE V®. During the optimization process, four representative wavelengths, 486.1, 546.1, 587.6, and 656.3 nm, were set with the weights of 1, 1, 2, and 1, respectively. The TIR constraints and structural constraints as well as the basic optical definitions, such as the effective focal length, were always applied. The effective focal lengths in both tangential and sagittal planes were constrained to be 15 mm. We further set the following parameters as variables: all the primary curvatures of all surfaces 501, 502, 503 in both tangential and sagittal planes, aspherical coefficients, decenter in both Y and Z directions, and tilt about the X axis. Although we did not directly set a constraint on distortion, we limited the height of the rays striking the image plane to avoid large and irregular distortion.

Figure 5:
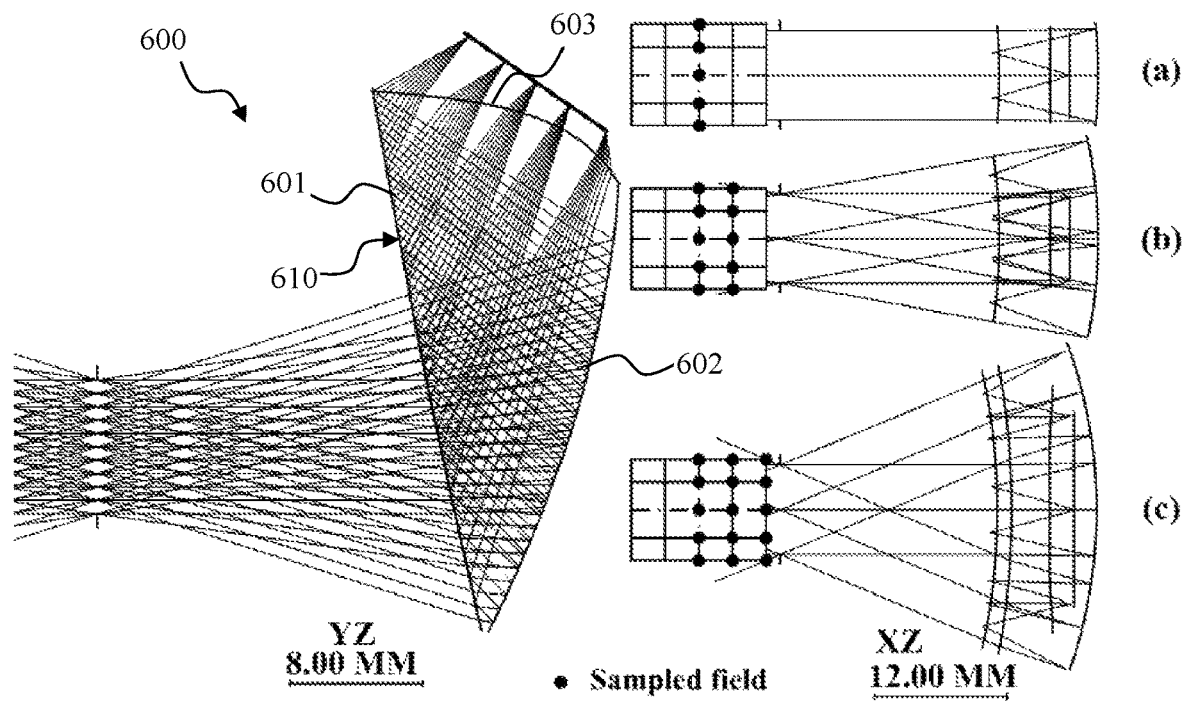
FIG. 5 schematically illustrates the system layout and sampled fields definition during different design stages of an exemplary optical see-through head-mounted display.

Due to its single-plane symmetry, the free-form prism-lens design had to be optimized over half of the full FOV sampled in a rectangular grid, as opposed to a linear sample in the radial direction in a rotationally symmetric system. It was difficult, however, to start the optimization across the entire FOV in a densely-sampled grid given the low performance of the starting point. Instead, we adopted a progressive optimization strategy by gradually increasing field samples as the system performance improved during the optimization process. The weighting factors of the sampled fields were inversely proportional to their distance from the center of the field. The decenter and tilt parameters were set as variables during the entire optimization process. FIG. 5 illustrates the field sampling strategy during the different stages of optimization. In the initial stage, as illustrated in FIG. 5(a), we sampled five fields along the vertical direction with the sagittal field angle being zero. It was important to optimize the system to meet the physical requirements such as eye clearance and TIR condition in this stage. During the optimization, we set the curvatures of surfaces 601 and 602 and the aspherical coefficients on rear surface 602 of the prism-lens 610 as variables. We also added curvature to surface 603 (which was a flat surface 503 in the starting Takahashi system 500) as a variable, and this surface 603 was later turned into a free-form surface to help limit the ray heights of the marginal fields with respect to the center field and improve the overall optical performance. The surface layout of the optimized system 600 on the XZ plane is shown in FIG. 5(a). After the first stage of optimization, we expanded the field samples by adding a fraction of the field angles along the sagittal direction. This stage of optimization was done by converting the surface type to AAS-type from ASP-type, and then the curvatures of the three surfaces in XZ plane were set as variables. The layout of the optimized system on the XZ plane is shown in FIG. 5(b). We continued to expand the field horizontally until the maximum field met our specification, and optimized the system repetitively by gradually adding the asymmetric coefficients as variables. A good starting point was finally achieved after the re-optimization. FIG. 5(c) shows the layout of the system on the XZ plane. It is worth pointing out that this optimization strategy can reduce the dependence on the performance of the initial starting point.

Figure 2:
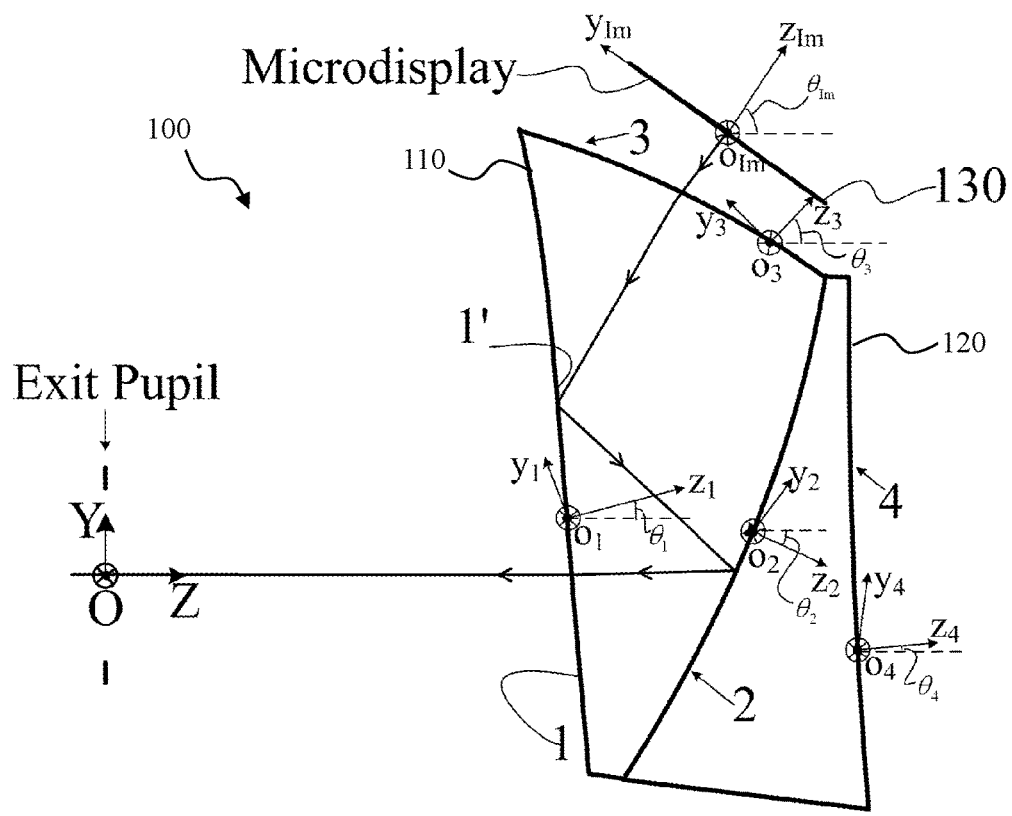
FIG. 2 schematically illustrates the layout of FIG. 1 showing the local coordinate system at each optical surface.
Figure 6:
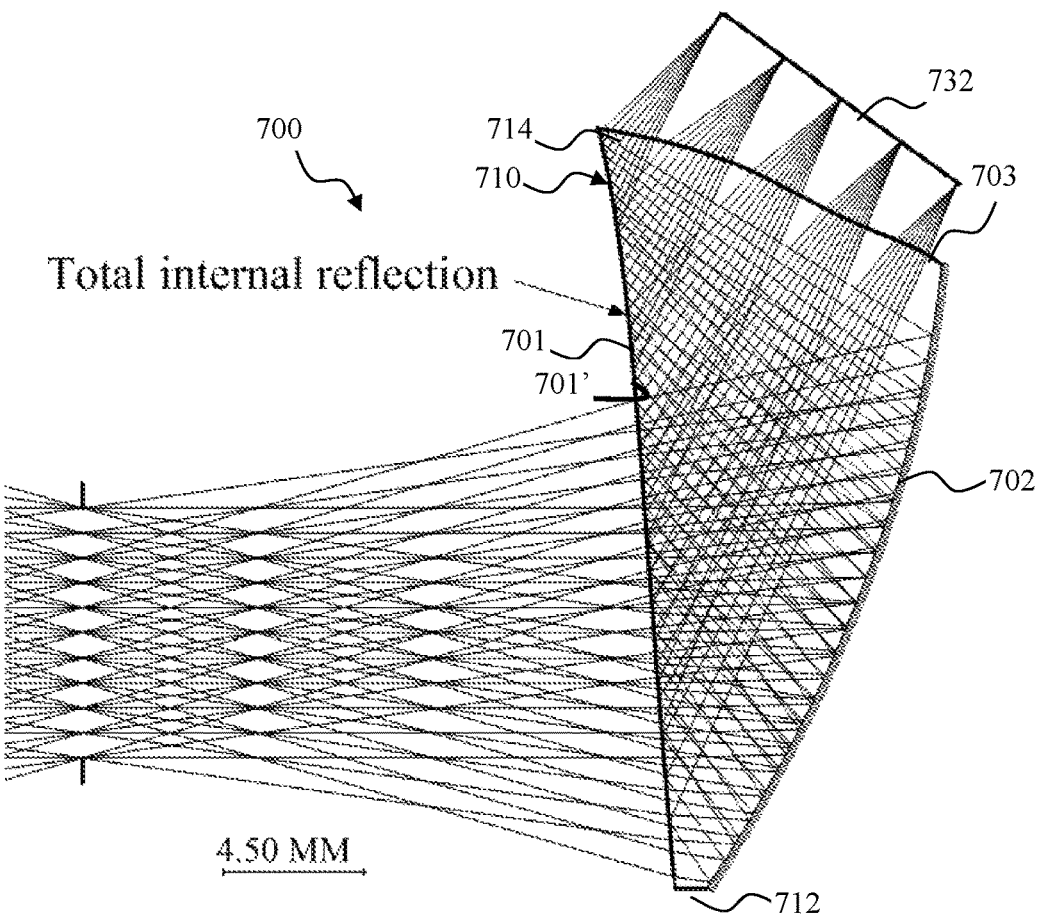
FIG. 6 schematically illustrates the layout of an exemplary free-form surface prism-lens system of the present invention having three free-form surfaces.

Following the design strategy above, we optimized the free-form surfaces using aspherical-type representations during the above steps for obtaining a good starting point. We then furthered the optimization by converting the ASP-type surfaces to AAS-type of surfaces and adding asymmetric coefficients up to the $10^{th}$ order as variables. To further optimize the system 600, we converted the AAS-type surfaces to XYP representations through a least-square fitting algorithm and carried out a global optimization. We found that this step of optimization was very effective in optimizing the FFS prism-lens system 700. The layout of the final FFS prism-lens design 700 is shown in FIG. 6. The distance from the bottom 712 to the top 714 of the left edge of the prism-lens 710 was 22 mm, the width along X-direction was 25 mm, the thickness along Z-axis was 12 mm, and the weight was 5 grams. The optical material of the prism-lens 710 was PMMA having a refractive index of 1.492 and Abbe number of 57.2. The locations, and effective areas, of the surfaces 701, 702, 703 relative to the global coordinate system having its origin at the exit pupil are given in Tables 2 and 3, respectively, below. The SPS XYP surfaces 701, 702, 703 were $10^{th}$-order polynomial surfaces added to a base conic. The polynomial was expanded into monomials of $x^m y^n$, where $m+n \leq 10$. The equation used was:

$$z = \frac{c(x^2 + y^2)}{1 + \text{sqrt}(1 - (1+k)c^2(x^2+y^2))} + \sum_{j=2}^{66} C_j x^m y^n,$$

$$j = [(m+n)^2 + m + 3n]/2 + 1$$

where z is the sag of the surface along the local z-axis, x and y are the coordinates in the local coordinate system, c is the vertex curvature (CUY), k is the conic constant, and $C_j$ is the coefficient for $x^m y^n$. FIG. 2 illustrates the local, right-handed coordinate system at each surface 701, 702, 703 to show the local x-, y-, and z-axes and tilt, θ (the x-axis is perpendicular to the plane of the figure). The FFS polynomial coefficients are provided in Table 8 at the end of the Detailed Description.

TABLE 2

Definition of the local surface references in the global coordinate system

|  | Origin of surface reference | | | Orientation of the surface Rotation about |
|---|---|---|---|---|
|  | X (mm) | Y (mm) | Z (mm) | X-axis θ (°) |
| Surface 1 Origin: $O_1(x_1,y_1,z_1)$ Orientation: $\theta_1$ | 0 | 0.305 | 18.25 | 1.7942 |
| Surface 2 Origin: $O_2(x_2,y_2,z_2)$ Orientation: $\theta_2$ | 0 | 0 | 24.34 | −23.08 |

TABLE 2-continued

Definition of the local surface references in the global coordinate system

|  | Origin of surface reference | | | Orientation of the surface Rotation about |
|---|---|---|---|---|
|  | X (mm) | Y (mm) | Z (mm) | X-axis θ (°) |
| Surface 3 Origin: $O_3(x_3,y_3,z_3)$ Orientation: $\theta_3$ | 0 | 15.534 | 19.403 | 53.4547 |
| Microdisplay Origin: $O_{Im}(x_{Im},y_{Im},z_{Im})$ Orientation: $\theta_{Im}$ | 0 | 17.101 | 24.272 | 54.1888 |

TABLE 3

Effective area of each surface

|  | (mm) | |
|---|---|---|
| surface 1 | | |
| X | −13 | 13 |
| Y | −8.3 | 15.9 |
| surface 2 | | |
| X | −13 | 13 |
| Y | −9.25 | 12.25 |
| surface 3 | | |
| X | −10 | 10 |
| Y | −8.55 | 2.75 |

Figure 7:
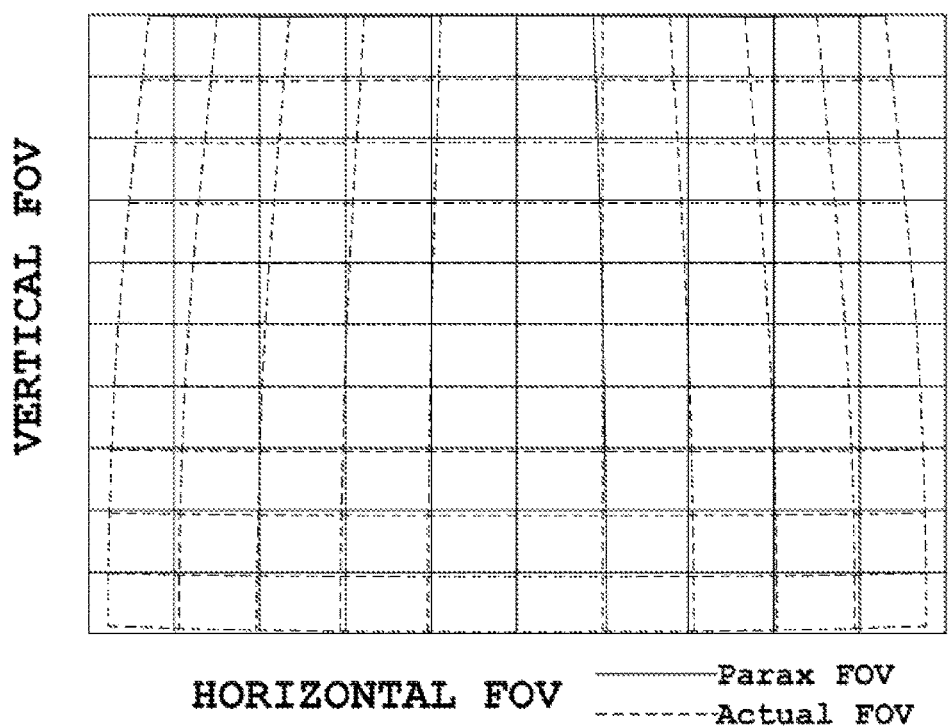
FIG. 7 illustrates a distortion plot of the free-form surface prism-lens system of FIG. 6.
Figure 8A:
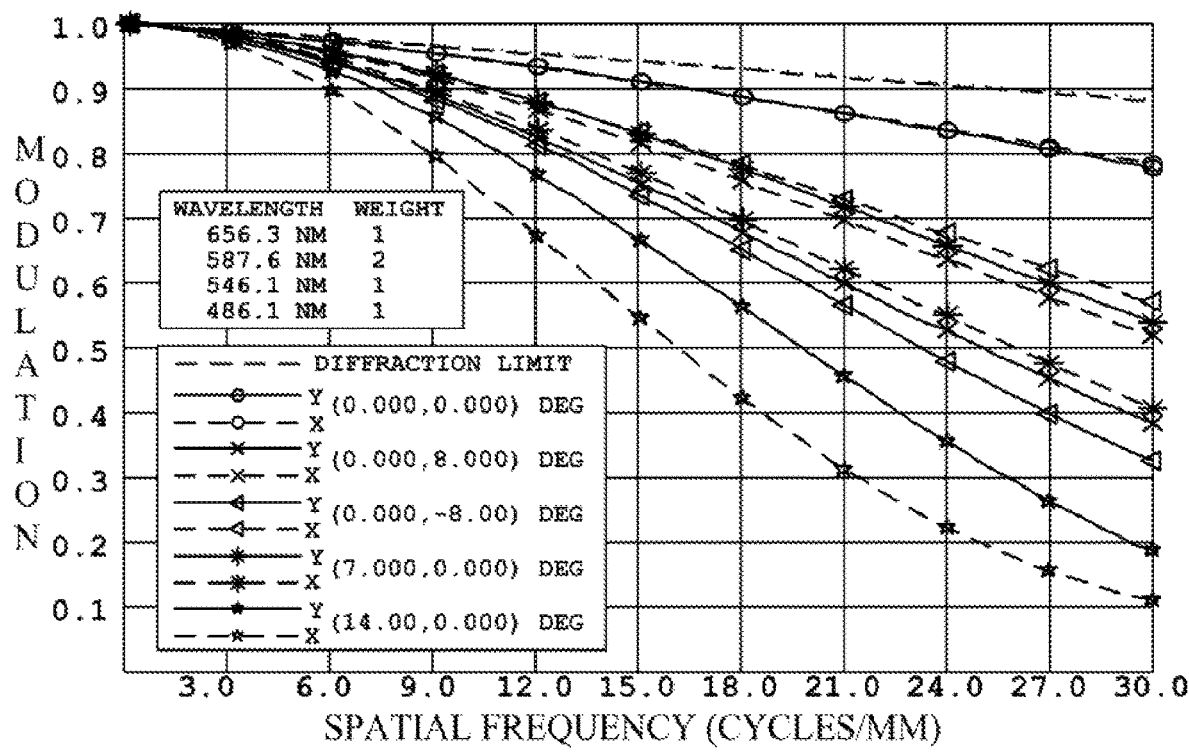
FIGS. 8A-8D illustrate the performance of the free-form surface prism-lens system of FIG. 6, with FIG. 8A showing the polychromatic MTF plot of the center field of the virtual imaging system, FIG. 8B showing the polychromatic MTF plot of marginal fields of the virtual imaging system, FIG. 8C showing the ray fan plots of the center fields, and FIG. 8D showing the ray fan plots of the marginal fields.
Figure 8B:
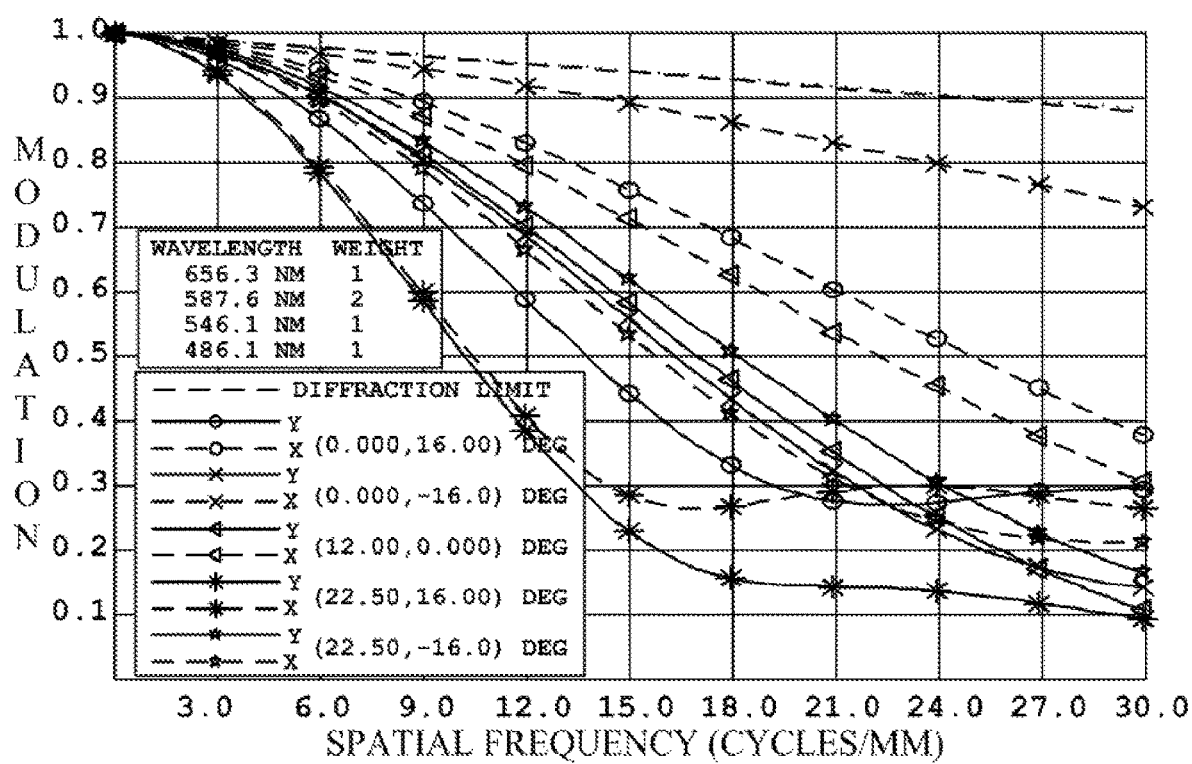
Figure 8C:
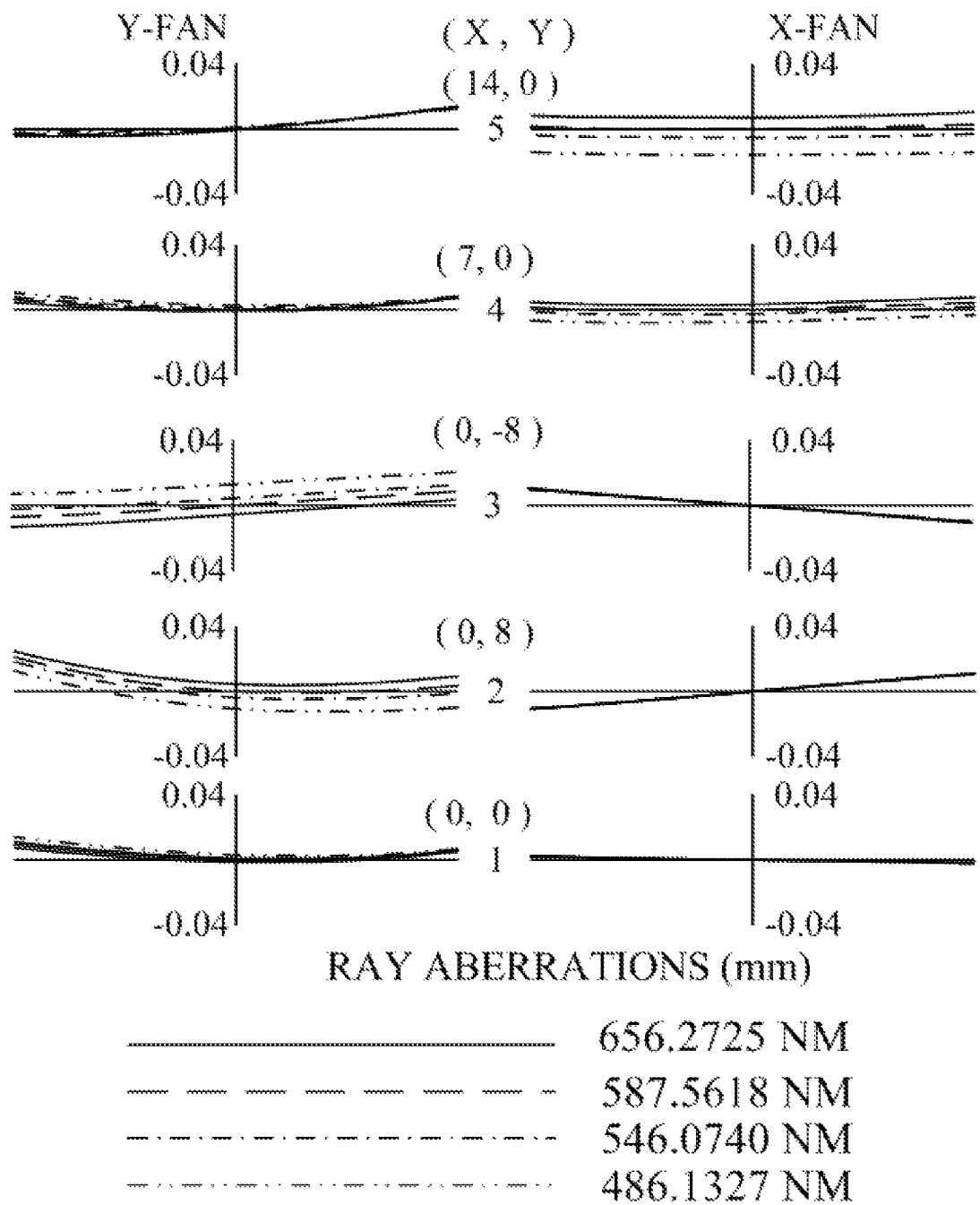
Figure 8D:
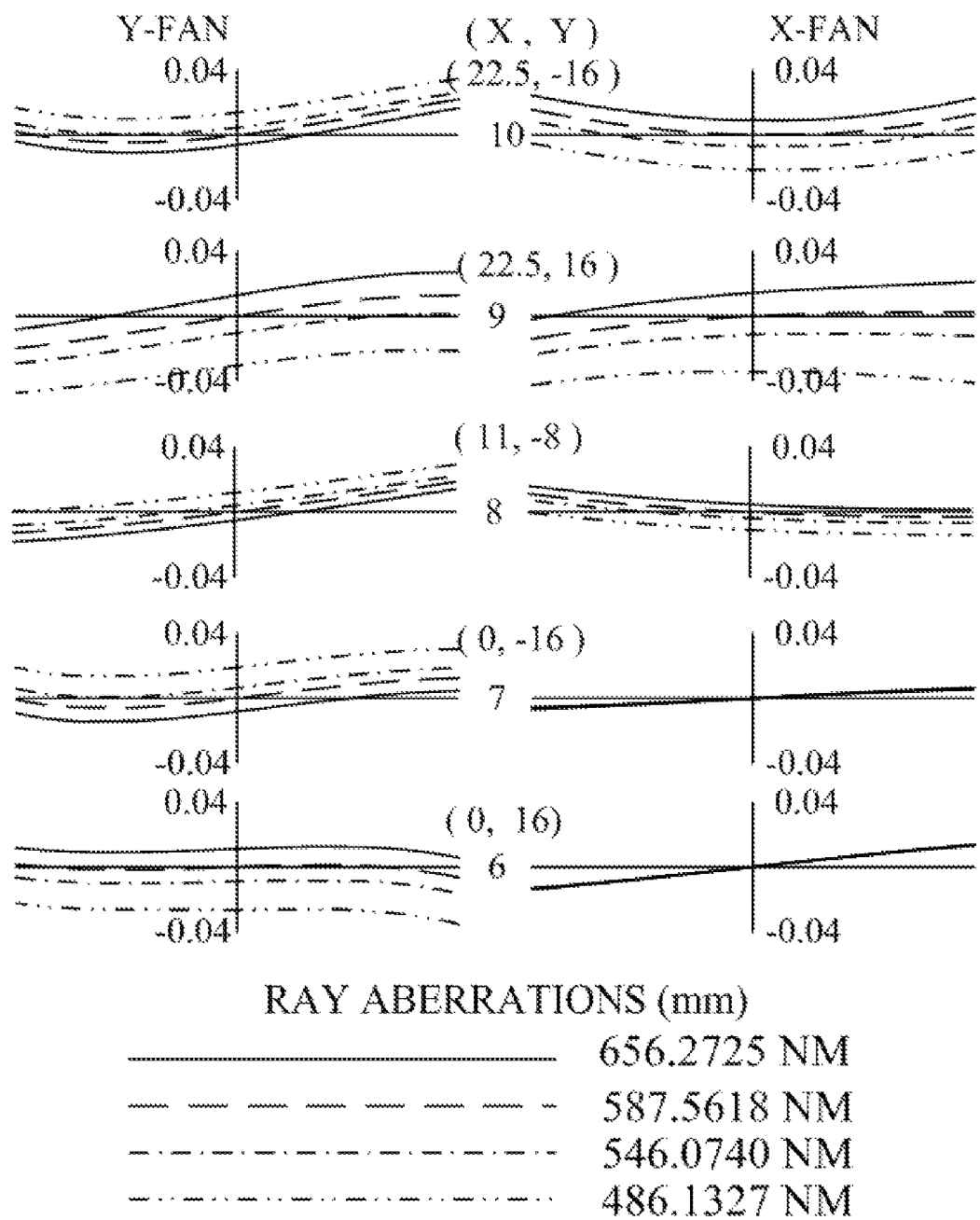

The optical performance of the optimized system 700 was assessed at the following representative field angles for the four design wavelengths: (0°, 0°), (0°, ±8°), (7°, 0°), (14°, 0°), (0°±16°), (22.5°, 0°), (22.5°, ±16°). FIGS. 7 through 8 demonstrate the optical performance of the microdisplay viewing path. As shown in FIG. 7, the distortion in the microdisplay path was up to 12% at the top left/right corners. Such large distortion was mainly due to the trapezoidal shape distortion caused by surface 702, which is very difficult to correct, as well as a small amount of barrel distortion. By fitting with the distortion grid, we chose to pre-warp the image displayed on the microdisplay 730 to balance the distortion of the virtual image. The polychromatic MTF plots shown in FIGS. 8A-8B were evaluated for a centered 3-mm pupil, at the spatial frequency of 30 cycles/mm, which corresponds to the threshold spatial frequency of the OLED microdisplay 730. The MTF was 0.7 for the central (0°, 0°) field, 0.2 for the (0°, +160) field, and above 0.1 for the (22.5°, +16°) field. The rayfan plots of the system 100 were evaluated at a 3 mm pupil, shown in FIGS. 8C and 8D; the maximum error is the half of the starting system.

Figure 9A:
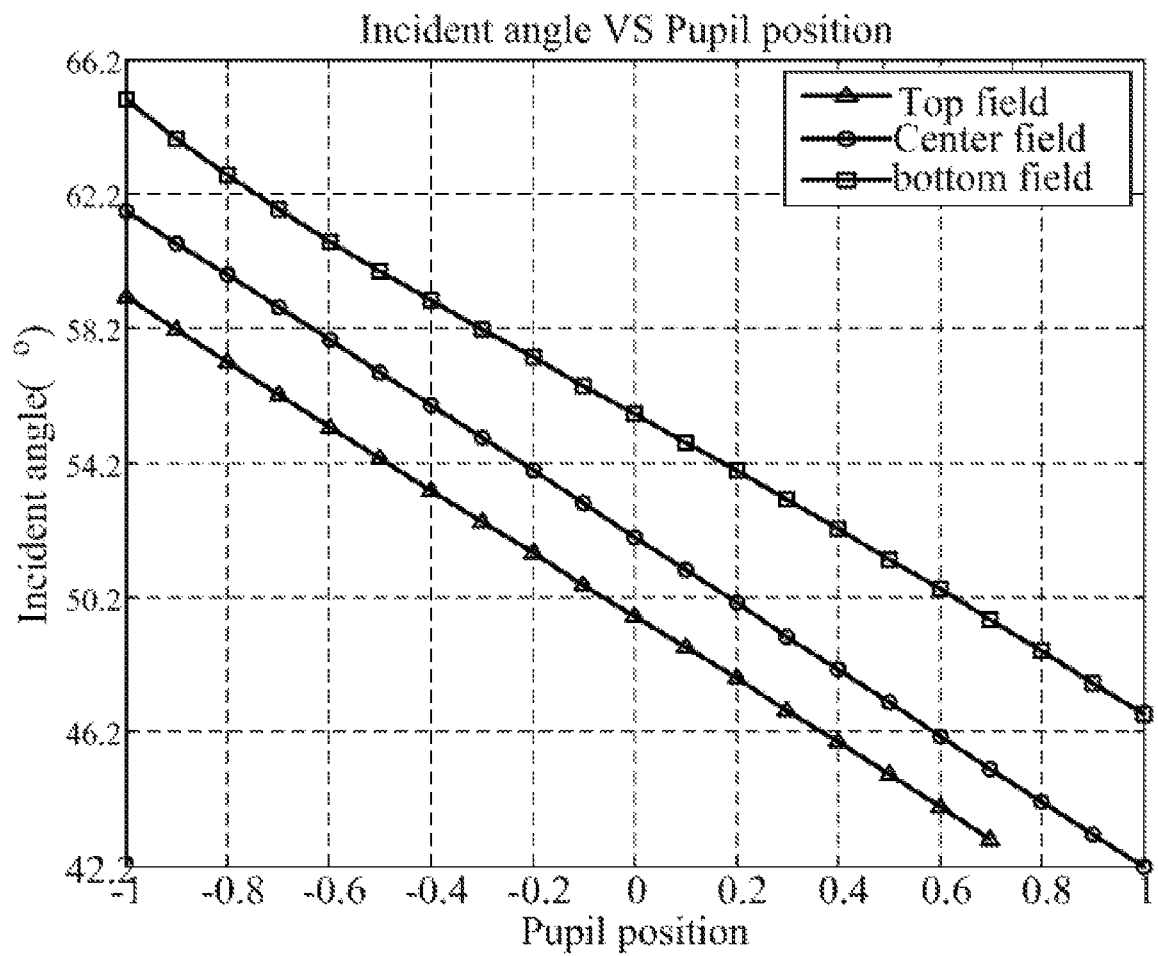
FIGS. 9A-9D illustrate the incident angle on the TIR surface, with FIG. 9A showing the incident angle on surface 1' as the ray pupil position varies from the bottom to the top, FIG. 9B showing the incident angle on surface 1' as the field of the ray changes from the lowermost to the uppermost in the meridian plane, FIG. 9C showing the incident angle on surface 1 as the ray pupil position varies from the bottom to the top, and FIG. 9D showing the incident angle on surface 1 as the field of the ray changes from the lowermost to the uppermost position in the tangential plane.
Figure 9B:
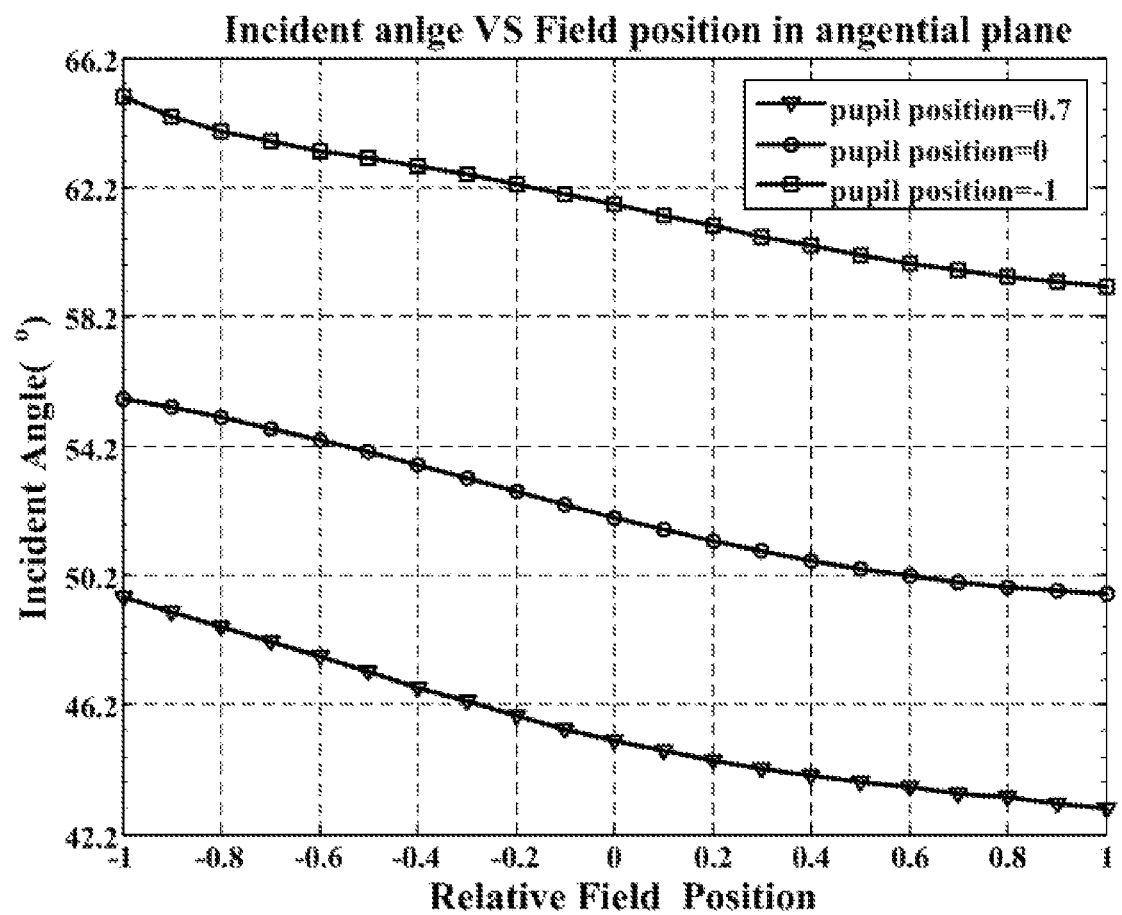
Figure 9C:
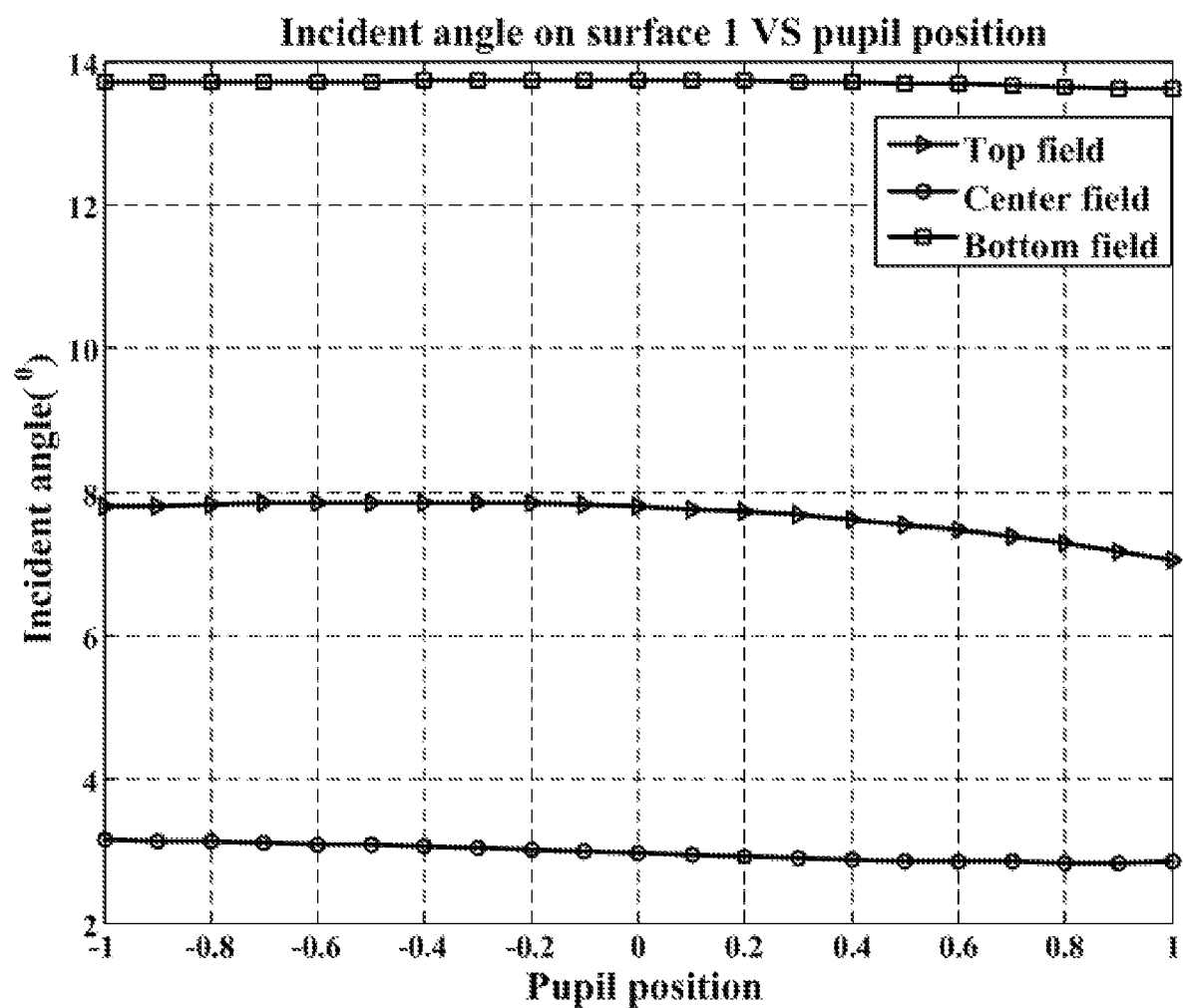
Figure 9D:
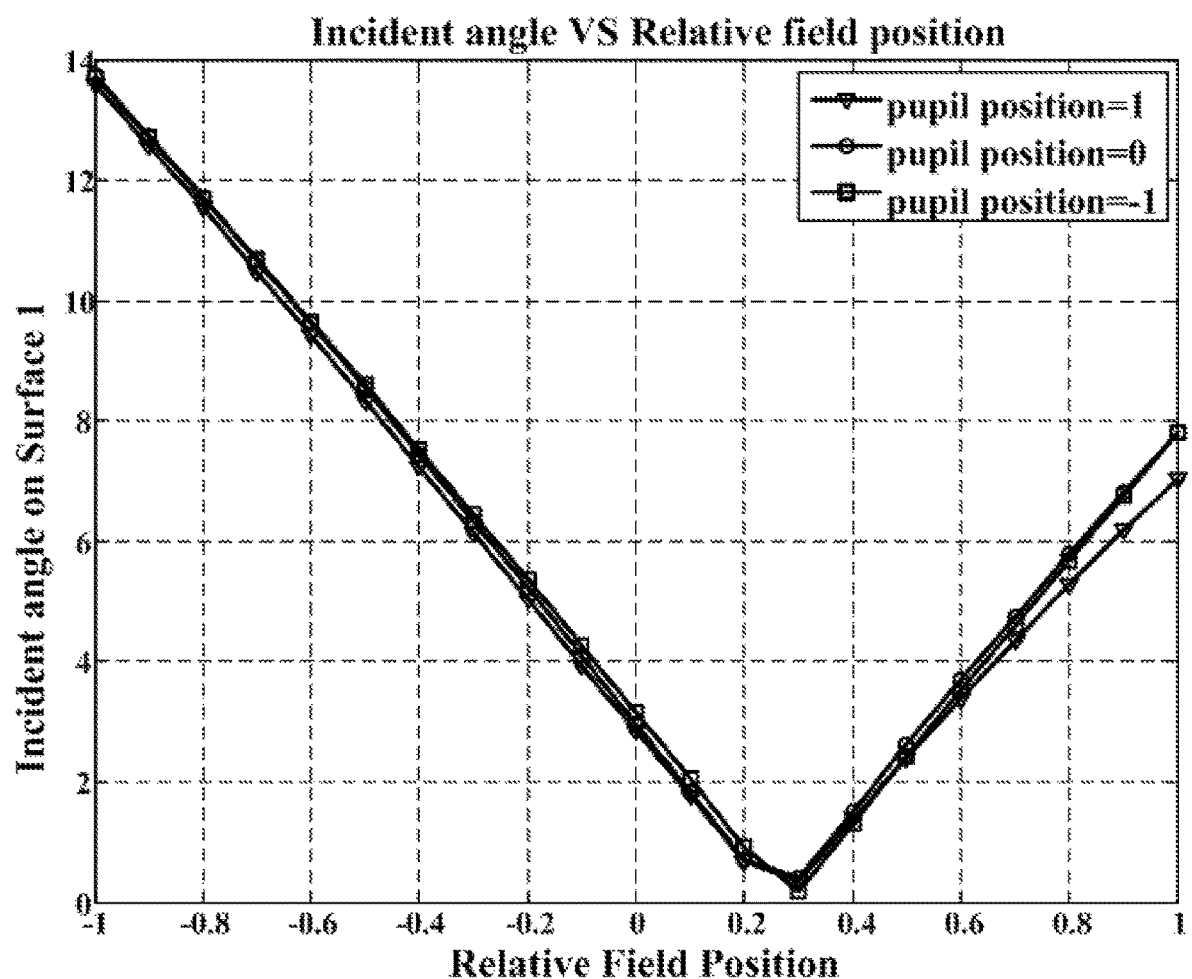

To demonstrate the effectiveness of the TIR constraints, FIGS. 9A and 9B plot the incident angle of rays on the surface 701' as a function of the pupil position and field position of the rays, respectively. As the pupil position of the rays is shifted from bottom to top, the incident angle on surface 701' decreased from 59.13° to 42.98° for the top field, from 61.66° to 42.20 for the center field and from 65.02° to 46.70° for the bottom field. Given the refractive index of the material in our final design was 1.492, all these angles were well controlled to satisfy the Eqn. (2). FIGS. 9C and 9D plot the incident angle of rays on the surface 701 as a function of the pupil position and field position of the rays, respectively. As the pupil position of the rays was shifted from bottom to top, the incident angle on surface 701 decreased from 7.8° to 7.0° for the top field, from 3.15° to 2.84° for the center field and from 13.7° to 13.6° for the bottom field. All these angles were far smaller than the critical angle, so they were well controlled to satisfy the Eqn. (3).

Design of the Auxiliary Free-Form Lens

Figure 10A:
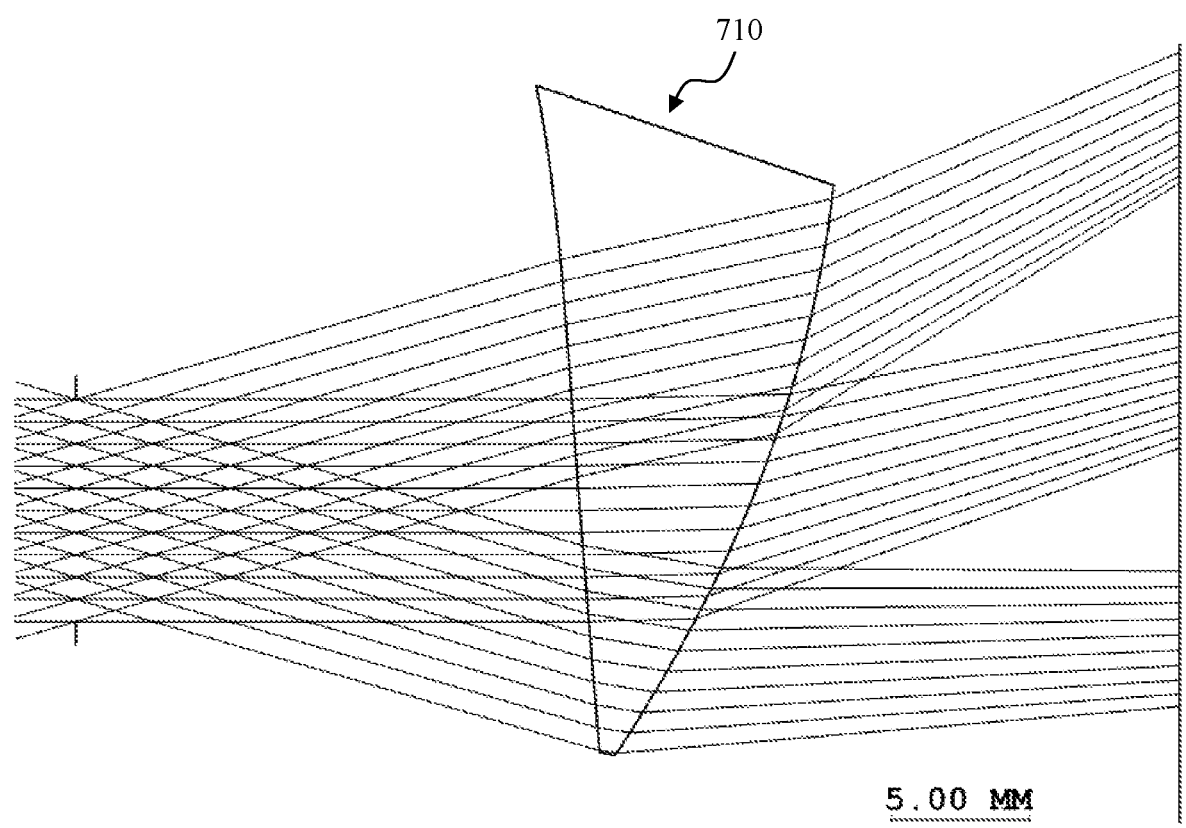
FIGS. 10A-10C schematically illustrates the design of an auxiliary lens to be used with the free-form surface prism-lens system of FIG. 6, with FIG. 10A showing see-through by the FFS prism-lens, FIG. 10B showing distortion caused by the FFS prism-lens, and FIG. 10C showing the design layout of the see-through system.
Figure 10B:
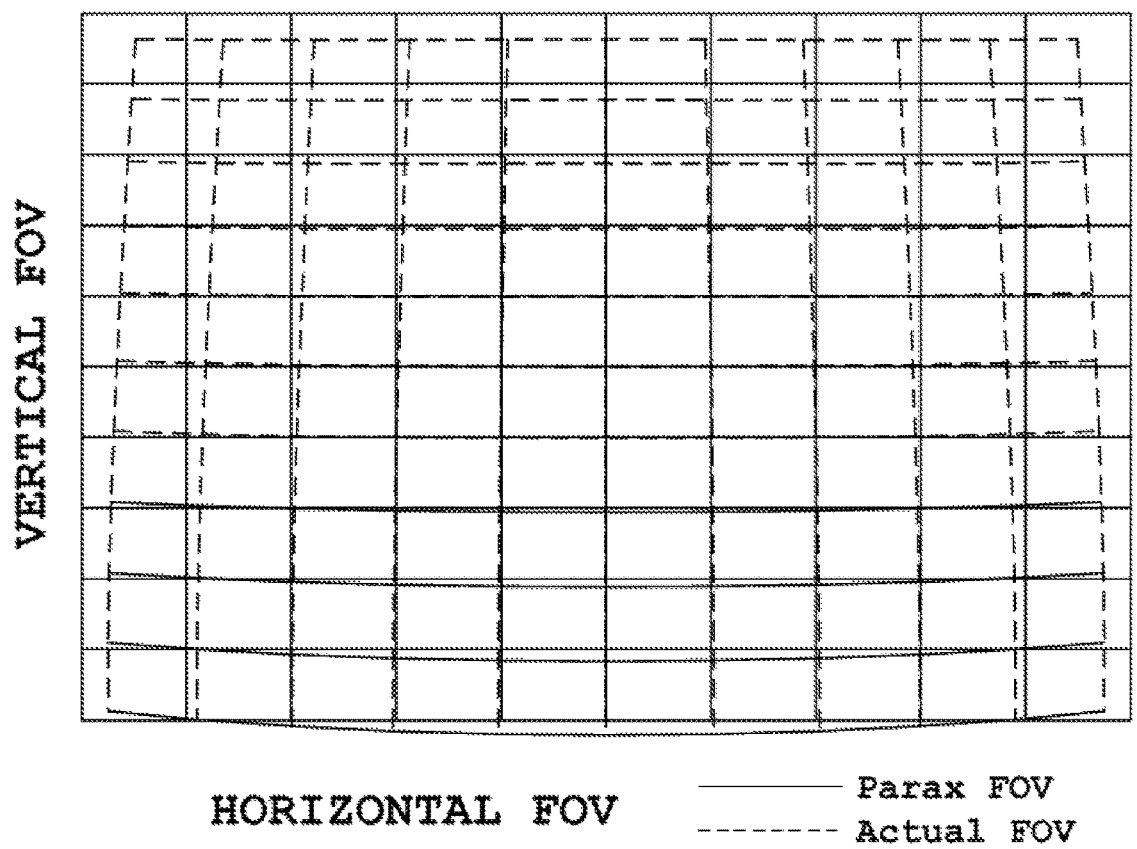

The free-form prism-lens 710 with curved surfaces produced optical power in the optical see-through path, causing a significant viewing axis deviation and undesirable distortion as well as other off-axis aberrations to the view of the real world scene. FIGS. 10A and 10B demonstrate the optical path and distortion grid of the real-world view through the free-form prism-lens 710. An auxiliary lens 720 was desired, to not only cancel the optical power in the see-through path, but also to correct the deviation of the optical axis and the off-axis aberrations introduced by the FFS prism-lens 710.

Figure 10C:
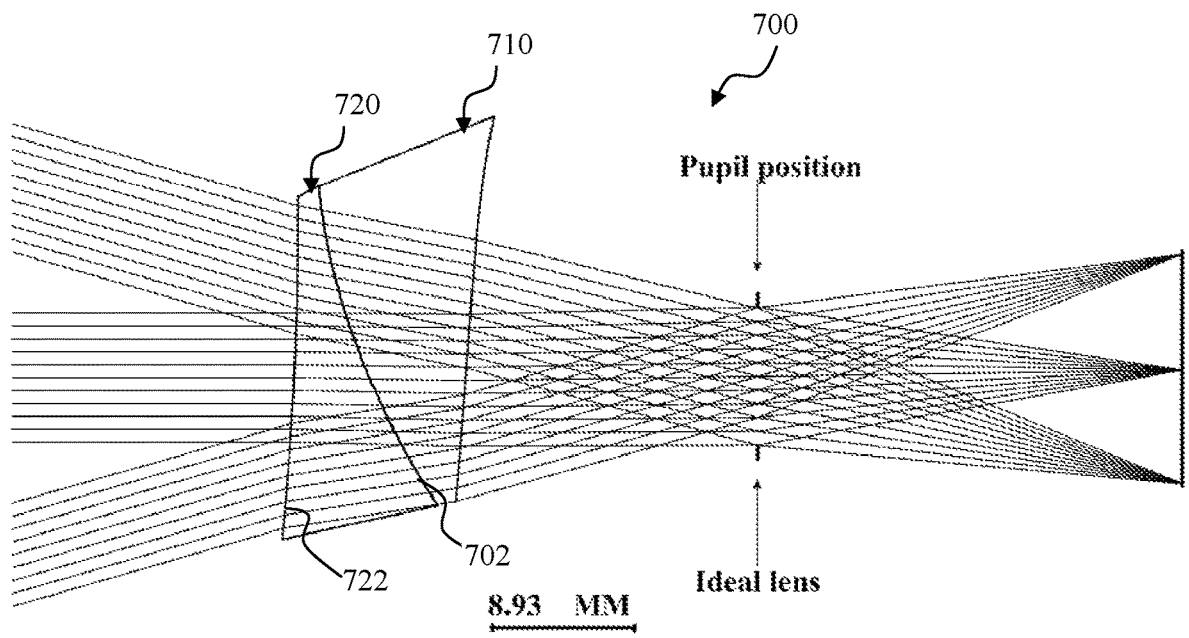

We chose to trace rays from the real-world scene to the eye space, as shown in FIG. 10C. We flipped the optimized FFS prism-lens 710 (FIG. 6) along the X-axis so that the pupil was to the right of the prism-lens 710. The reflective mode of the concave mirror surface 702 was changed to refractive mode. We then inserted a plastic auxiliary lens 720 to the left of the prism-lens 710, and the lens surface adjacent to the prism-lens 710 was matched to the concave surface 702 of the prism-lens 710, which ensured that the auxiliary lens 720 and prism-lens 710 could be cemented accurately which simplified the design of the auxiliary free-form lens 720. As a result, the front surface 722 of the auxiliary lens 720 only needed to compensate for the optical power introduced by surface 701 of the prism-lens 710 of the FFS prism-lens 710. Although we could start the optimization of the lens with a planar front surface 722, a good approximation is to initialize the front surface 722 with the same shape as surface 701 of the prism-lens 710. The combination of the auxiliary lens and the prism-lens 710 should ideally form an afocal system 700 for a real-world scene at optical infinity as the object distance is considerably larger than the EFL of the system 700. Therefore, we inserted an ideal lens at the eye position with an effective focal length equivalent to the human eye to focus the collimated rays. During the optimization process, we only set the curvature and polynomial coefficients of the front surface 722 of the auxiliary lens 720 as variables. We set constraints on the distortion and aberrations. The specification for the front surface 722 of the auxiliary lens 720 is provided as "Surface 4" in Table 8 below.

Figure 11:
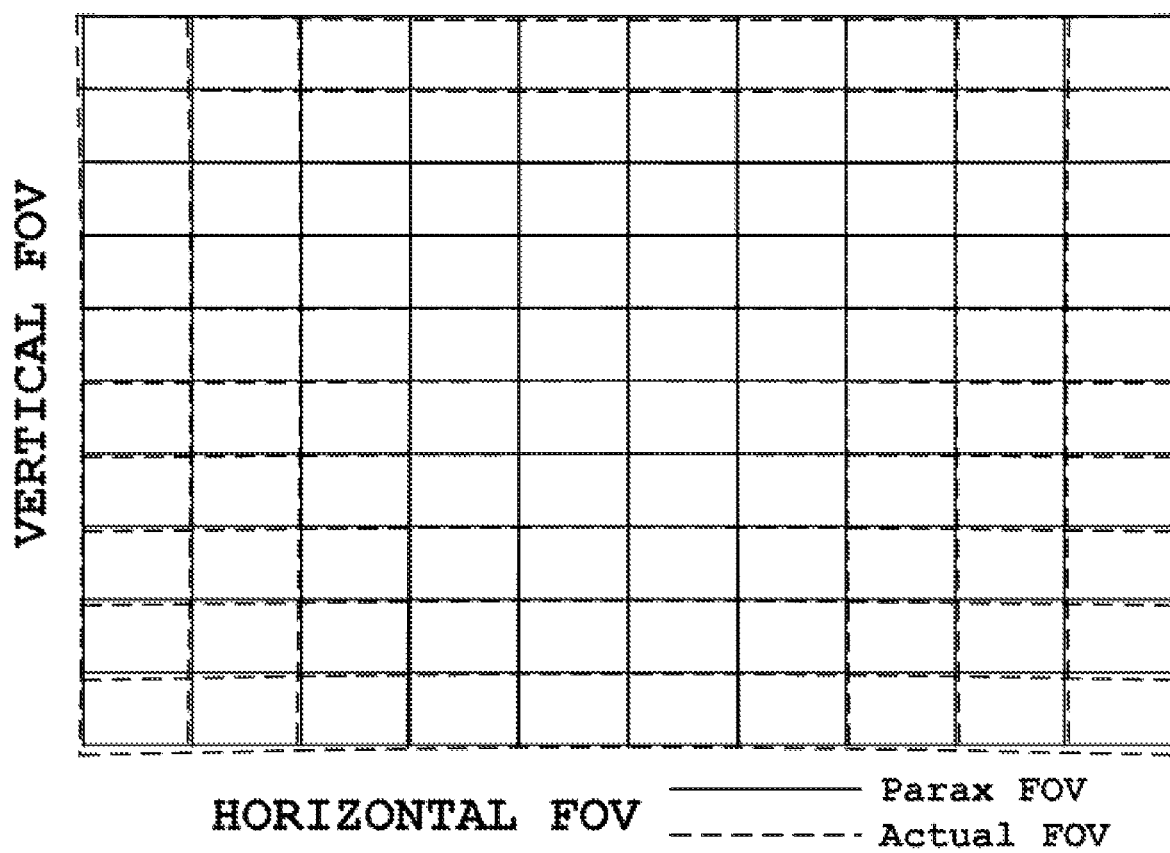
FIG. 11 illustrates a distortion plot of the optical see-through system of FIG. 10.
Figure 12A:
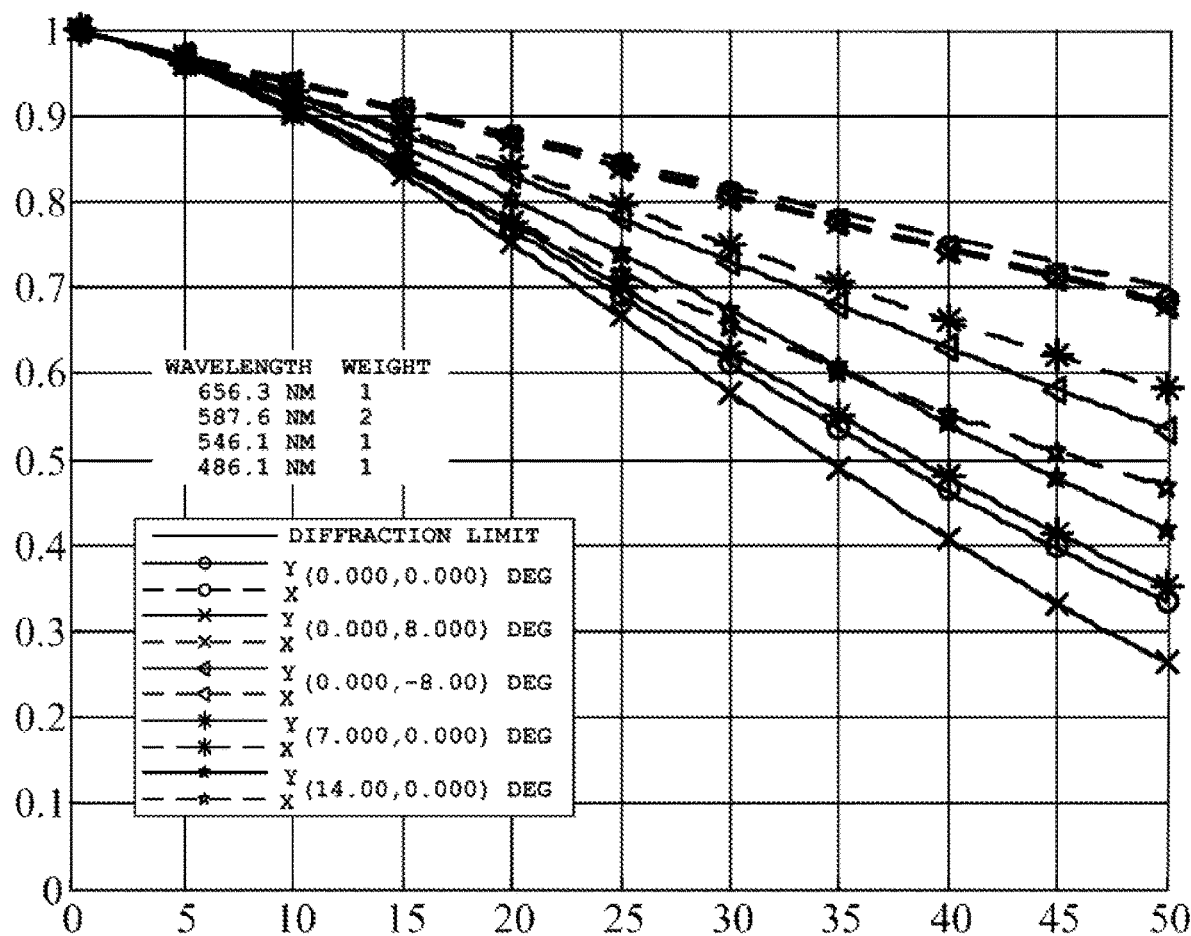
FIGS. 12A-12B illustrate polychromatic MTF plots of the optical see-through system of FIG. 10 with an ideal lens.
Figure 12B:
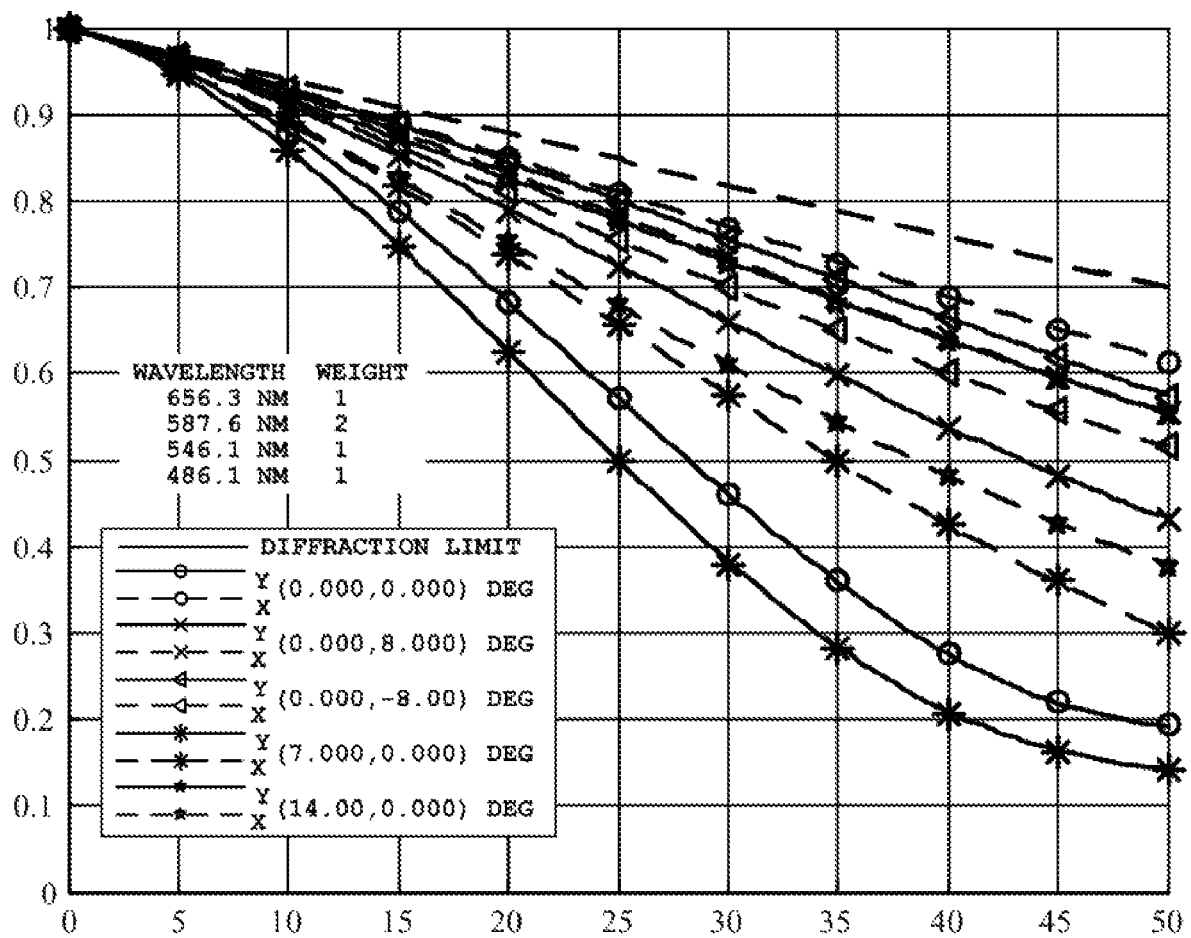

FIGS. 11 through 12 demonstrate the optical performance of the optical see-through path. The polychromatic MTF plots were evaluated at a 3 mm pupil, shown in FIGS. 12A-12B. At the spatial frequency of 50 cycles/mm, the MTF was 0.6 for the central (00, 0°) field, 0.4 for the (0°, ±8°) field, and 0.2 for the marginal (22.5°, ±160) field, which suggested that the image quality of a real-world is well-balanced across the fields and well preserved. As shown in FIG. 11, the distortion in the see-through path is below 1.4% across the field, which is negligible. The distortion caused by the FFS prism-lens 710 is as high as 10%, as shown in FIG. 10B. The auxiliary free-form lens 720 effectively corrected the viewing axis deviation and the distortion.

Figure 13:
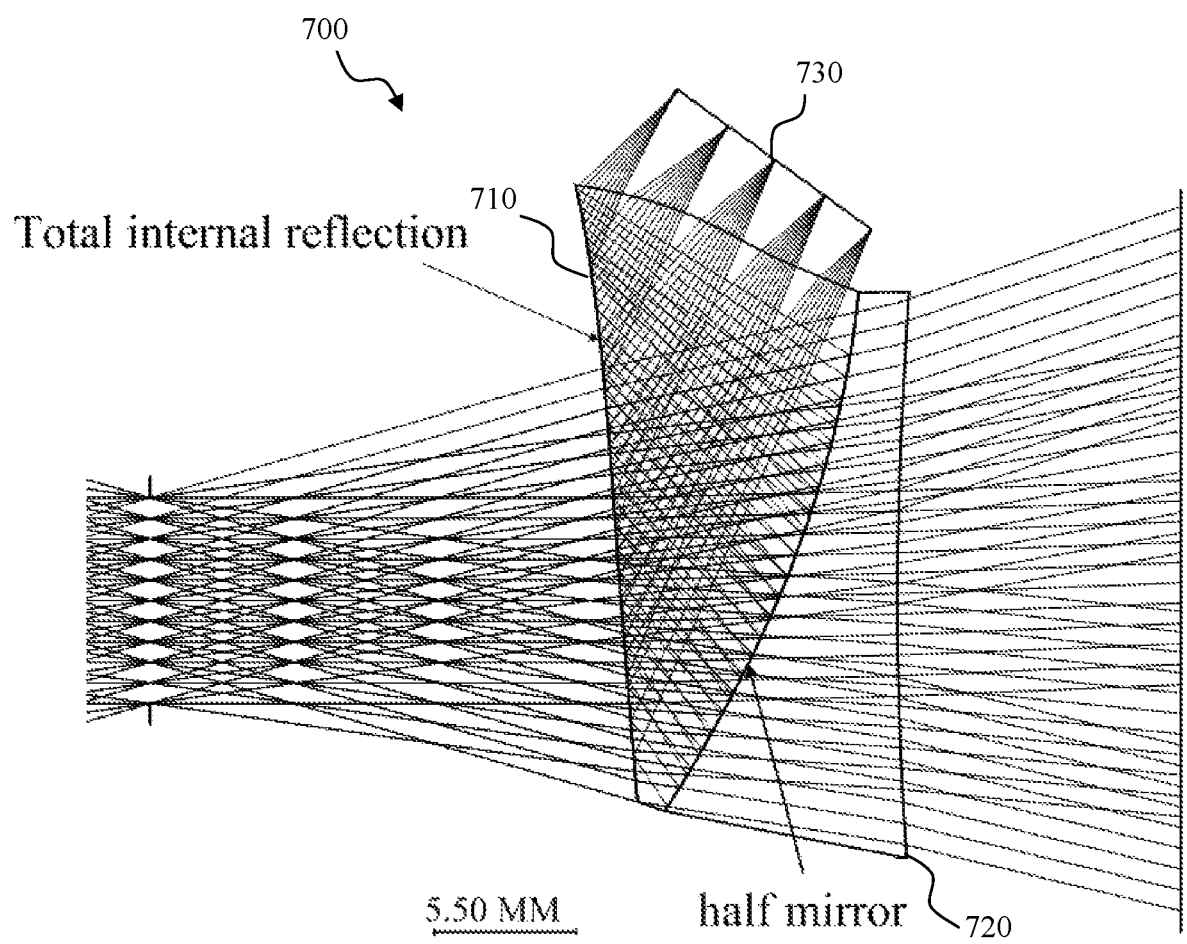
FIG. 13 schematically illustrates the layout of the see-through HMD by coupling the FFS prism-lens system and auxiliary FFS lens of FIG. 10.

The final design of the auxiliary lens 720 combined with the FFS prism-lens 710 is shown in FIG. 13, which demonstrates excellent correction to the deviation of the see-through optical path. The overall thickness of the combined prism-lens system 700 is approximately the same as the prism-lens 710 alone. The optical material of the auxiliary lens 720 was PMMA having a refractive index of 1.492 and Abbe number of 57.2. The locations, and effective areas, of the surfaces relative to the global coordinate system having its origin at the exit pupil are give in Tables 4 and 5, respectively, below.

TABLE 4

Definition of the local surface references in the global coordinate system OXYZ.

| | Origin of surface reference | | | Orientation of the surface Rotation about |
|---|---|---|---|---|
| | X (mm) | Y (mm) | Z (mm) | X-axis θ (°) |
| Surface 1 Origin: $O_1(x_1,y_1,z_1)$ Orientation: $\theta_1$ | 0 | 0.305 | 18.25 | 1.7942 |
| Surface 2 Origin: $O_2(x_2,y_2,z_2)$ Orientation: $\theta_2$ | 0 | 0 | 24.34 | −23.08 |
| Surface 3 Origin: $O_3(x_3,y_3,z_3)$ Orientation: $\theta_3$ | 0 | 15.534 | 19.403 | 53.4547 |
| Surface 4 Origin: $O_4(x_4,y_4,z_4)$ Orientation: $\theta_4$ | 0 | 0 | 29 | 0 |
| Microdisplay Origin: $O_{Im}(x_{Im},y_{Im},z_{Im})$ Orientation: $\theta_{Im}$ | 0 | 17.101 | 24.272 | 54.1888 |

TABLE 5

Effective area of each surface

| | (mm) | |
|---|---|---|
| Surface 1 | | |
| X | −13 | 13 |
| Y | −8.3 | 15.9 |
| Surface 2 | | |
| X | −13 | 13 |
| Y | −9.25 | 12.25 |
| Surface 3 | | |
| X | −10 | 10 |
| Y | −8.55 | 2.75 |
| Surface 4 | | |
| X | −13 | 13 |
| Y | −10 | 12 |

Prototype and Experimental Results

Figure 14A:
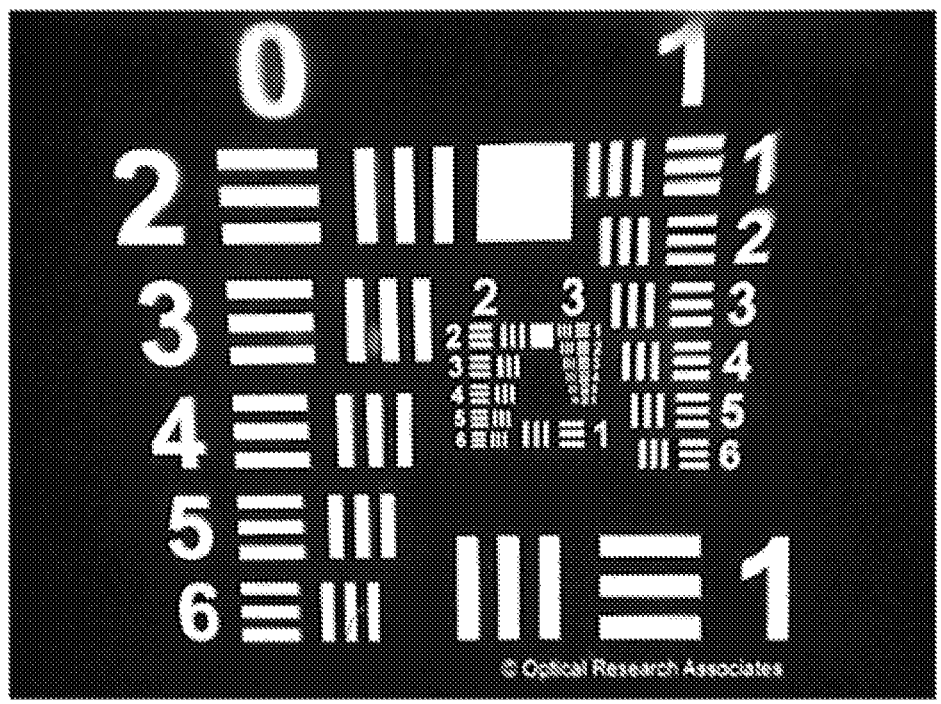
FIG. 14A illustrates a photo without pre-warping the input image, and FIG. 14B a photo after pre-warping the input image taken through a fabricated prototype of the FFS prism-lens of FIG. 6.
Figure 14B:
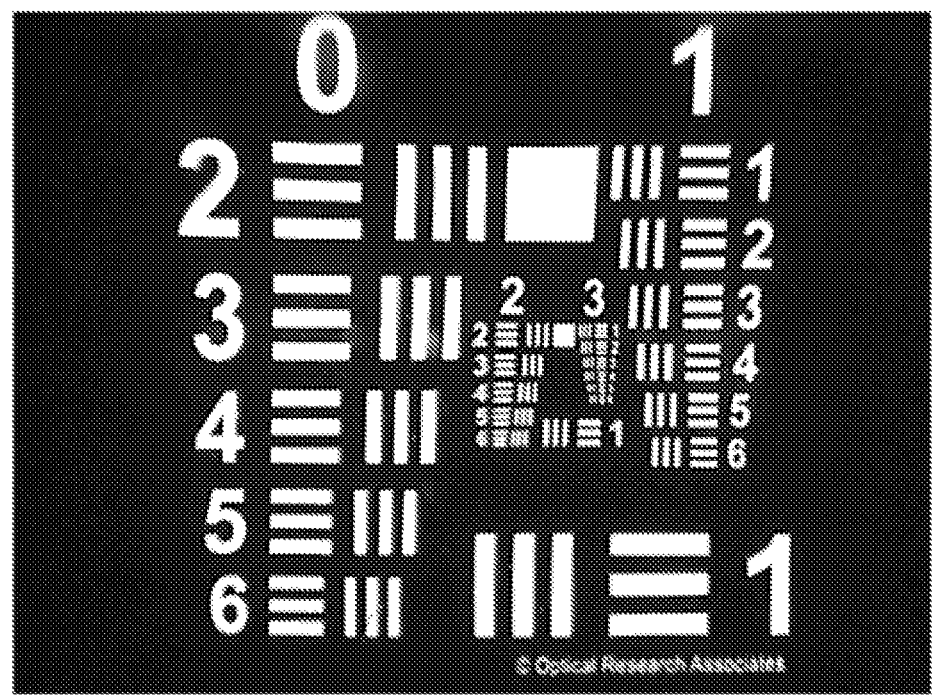

The FFS prism-lens 710 was fabricated through a molding approach. FIG. 14A shows a photo taken at the exit pupil of the system 700 to demonstrate the image quality of the microdisplay viewing optics. The distortion was noticeable and irregular. The upper portion of the displayed image seems nearer than the lower portion of the image. The distortion correction method of a free-form surface system 700 is different from rotationally symmetric systems where distortion can be corrected with sufficient accuracy by 3 radial and 2 tangential coefficients. To correct the distortion in the free-form system 700, a more complex model with more coefficients would be required. Alternatively, we calculated the mapping from the undistorted image to a distorted image using the distortion plot in FIG. 7 and then applied the mapping matrix on the undistorted image to pre-warp the image. As shown in FIG. 7, 11 by 11 grids were sampled to calculate the distortion mapping. Similarly, we divided the effective image plane into 800×600 grids, then calculated the corresponding fields on the eye side from the height of the grid corners and implemented ray tracing in CODE V® to find the chief rays' intersection points with the image plane of all the fields. The one to one mapping matrix from the undistorted image to the distorted image was calculated between ideal points (grid corners) and the ray traced points on the image plane. We could then generate the pre-warped image by applying the one to one mapping matrix on the undistorted image and displayed the pre-warped image on the microdisplay 730. FIG. 15A is a photo taken at the exit pupil position without pre-warping the input image, while FIG. 15B is a photo after pre-warping the input image.

Further Design Example

The techniques described above where employed to provide a second exemplary design. Again, the optical material of the prism-lens was PMMA having a refractive index of 1.492 and Abbe number of 57.2. The locations, and effective areas, of the surfaces relative to the global coordinate system having its origin at the exit pupil are give in Tables 6 and 7, respectively, below. The FFS polynomial coefficients are provided in Table 9 below.

TABLE 6 the local surface references in the global coordinate system OXYZ.

| | Origin of surface reference | | | Orientation of the surface Rotation about |
|---|---|---|---|---|
| | X (mm) | Y (mm) | Z (mm) | X-axis θ (°) |
| Surface 1 Origin: $O_1(x_1,y_1,z_1)$ Orientation: $\theta_1$ | 0 | −4 | 19.18 | 6.04937 |
| Surface 2 Origin: $O_2(x_2,y_2,z_2)$ Orientation: $\theta_2$ | 0 | −3.2 | 23.65 | −26.4722 |
| Surface 3 Origin: $O_3(x_3,y_3,z_3)$ Orientation: $\theta_3$ | 0 | 16.044 | 23.35 | 53.2281 |
| Surface 4 Origin: $O_4(x_4,y_4,z_4)$ Orientation: $\theta_4$ | 0 | 0.514 | 29.968 | 6 |
| Microdisplay Origin: $O_{Im}(x_{Im},y_{Im},z_{Im})$ Orientation: $O_{Im}$ | 0 | 17.978 | 25.011 | 49.247 |

TABLE 7

Effective area of each surface

| | (mm) | |
|---|---|---|
| Surface 1 | | |
| X | −15 | 15 |
| Y | −6 | 22 |
| Surface 2 | | |
| X | −15 | 15 |
| Y | −8 | 16 |
| Surface 3 | | |
| X | −10 | 10 |
| Y | −6.5 | 6.5 |

TABLE 7-continued

Effective area of each surface

| | (mm) | |
|---|---|---|
| Surface 4 | | |
| X | −15 | 15 |
| Y | −11.5 | 12.5 |

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. For instance, other shapes of free-form surfaces may be utilized in the designs of the present invention. By way of example, if one wanted to vary the surface curvature independently in the x and y directions, the surface could be represented by $$z = \frac{c_x x^2 + c_y y^2}{1 + \text{sqrt}(1 - (1+k_x)c_x x^2 - (1+k_y)c_y y^2)} + \sum_{j=1}^{37} C_j x^{2m} y^n$$

$$2m + n \le 10, m = 0, 1, 2, 3, 4, 5, n = 0, 1, \ldots, 10$$

where z is the sag along the local z-axis, x and y are the coordinates in the local coordinate system, k is the conic constant, $c_x$ is radius of curvature of surface in sagittal direction, $c_y$ is radius of curvature of surface in tangential direction, and $C_j$ is the coefficient for $x^{2m}y^n$. It should therefore be understood that this invention is not limited to the particular embodiments described herein, but is intended to include all changes and modifications that are within the scope and spirit of the invention as set forth in the claims.

| Coefficients | comment | Surface 1 | Surface 2 |
|---|---|---|---|
| cuy | c | −0.000285105 | −0.039092523 |
| c67 | normalized radius | 1 | 1 |
| c1 | k | 0 | 0 |
| c2 | x | 0 | 0 |
| c3 | y | −4.554727019060E−02 | 0.000000000000E+00 |
| c4 | $x_2$ | −9.529768572360E−03 | 3.799883836350E−03 |
| c5 | xy | 0.000000000000E+00 | 0.000000000000E+00 |
| c6 | $y^2$ | 8.880680850880E−04 | 8.811637430275E−03 |
| c7 | $x^3$ | 0.000000000000E+00 | 0.000000000000E+00 |
| c8 | $x^2 y$ | −2.274693243620E−04 | −4.120156490413E−05 |
| c9 | $xy^2$ | 0.000000000000E+00 | 0.000000000000E+00 |
| c10 | $y^3$ | −2.250128361500E−05 | −1.162523138271E−04 |
| c11 | $x^4$ | 1.363374558440E−05 | 8.274939784188E−06 |
| c12 | $x^3 y$ | 0.000000000000E+00 | 0.000000000000E+00 |
| c13 | $x^2 y^2$ | −3.835587301810E−05 | 1.217474597638E−05 |
| c14 | $xy^3$ | 0.000000000000E+00 | 0.000000000000E+00 |
| c15 | $y^4$ | −8.630487450540E−06 | 1.240101301250E−05 |
| c16 | $x^5$ | 0.000000000000E+00 | 0.000000000000E+00 |
| c17 | $x^4 y$ | −1.985502857350E−07 | −3.848552333625E−08 |
| c18 | $x^3 y^2$ | 0.000000000000E+00 | 0.000000000000E+00 |
| c19 | $x^2 y^3$ | 1.202547290150E−06 | 4.252351660938E−07 |
| c20 | $xy^4$ | 0.000000000000E+00 | 0.000000000000E+00 |
| c21 | $y^5$ | −2.259740420160E−07 | −1.854520775606E−08 |
| c22 | $x^6$ | −2.190859953400E−08 | −7.328932049703E−10 |
| c23 | $x^5 y$ | 0.000000000000E+00 | 0.000000000000E+00 |
| c24 | $x^4 y^2$ | −1.532516744660E−09 | 3.774337431125E−08 |
| c25 | $x^3 y^3$ | 0.000000000000E+00 | 0.000000000000E+00 |
| c26 | $x^2 y^4$ | 2.361733529370E−08 | −9.746364392781E−08 |
| c27 | $xy^5$ | 0.000000000000E+00 | 0.000000000000E+00 |

-continued

| Coefficients | comment | Surface 3 | Surface 4 |
|---|---|---|---|
| c28 | $y^6$ | 1.116521684700E−08 | −2.777925130281E−08 |
| c29 | $x^7$ | 0.000000000000E+00 | 0.000000000000E+00 |
| c30 | $x^6 y$ | 6.000609985730E−20 | −9.790340156094E−10 |
| c31 | $x^5 y^2$ | 0.000000000000E+00 | 0.000000000000E+00 |
| c32 | $x^4 y^3$ | −5.043712711540E−20 | 1.456155907344E−10 |
| c33 | $x^3 y^4$ | 0.000000000000E+00 | 0.000000000000E+00 |
| c34 | $x^2 y^5$ | −5.117716418980E−20 | 6.072571241477E−09 |
| c35 | $xy^6$ | 0.000000000000E+00 | 0.000000000000E+00 |
| c36 | $y^7$ | −8.492659970480E−18 | 9.635155206406E−10 |
| c37 | $x^8$ | 7.666995972280E−11 | 1.071711944156E−10 |
| c38 | $x^7 y$ | 0.000000000000E+00 | 0.000000000000E+00 |
| c39 | $x^6 y^2$ | −7.767376892480E−11 | 0.000000000000E+00 |
| c40 | $x^5 y^3$ | 0.000000000000E+00 | 0.000000000000E+00 |
| c41 | $x^4 y^4$ | 2.950846077350E−11 | 0.000000000000E+00 |
| c42 | $x^3 y^5$ | 0.000000000000E+00 | 0.000000000000E+00 |
| c43 | $x^2 y^6$ | −4.982363079300E−12 | 0.000000000000E+00 |
| c44 | $xy^7$ | 0.000000000000E+00 | 0.000000000000E+00 |
| c45 | $y^8$ | 3.154691021580E−13 | 0.000000000000E+00 |
| c46 | $x^9$ | 0.000000000000E+00 | 0.000000000000E+00 |
| c47 | $x^8 y$ | −1.654239598390E−22 | 0.000000000000E+00 |
| c48 | $x^7 y^2$ | 0.000000000000E+00 | 0.000000000000E+00 |
| c49 | $x^6 y^4$ | 1.373514352470E−22 | 0.000000000000E+00 |
| c50 | $x^5 y^4$ | 0.000000000000E+00 | 0.000000000000E+00 |
| c51 | $x^4 y^5$ | 3.089957605530E−22 | 0.000000000000E+00 |
| c52 | $x^3 y^6$ | 0.000000000000E+00 | 0.000000000000E+00 |
| c53 | $x^2 y^7$ | 7.625247748780E−22 | 0.000000000000E+00 |
| c54 | $xy^8$ | 0.000000000000E+00 | 0.000000000000E+00 |
| c55 | $y^9$ | −3.658104101010E−20 | 0.000000000000E+00 |
| c56 | $x^{10}$ | −5.304042934200E−14 | 0.000000000000E+00 |
| c57 | $x^9 y$ | 0.000000000000E+00 | 0.000000000000E+00 |
| c58 | $x^8 y^2$ | −2.253404112780E−13 | 0.000000000000E+00 |
| c59 | $x^7 y^3$ | 0.000000000000E+00 | 0.000000000000E+00 |
| c60 | $x^6 y^4$ | −3.829417935900E−13 | 0.000000000000E+00 |
| c61 | $x^5 y^5$ | 0.000000000000E+00 | 0.000000000000E+00 |
| c62 | $y^4 y^5$ | −3.253841807830E−13 | 0.000000000000E+00 |
| c63 | $x^3 y^7$ | 0.000000000000E+00 | 0.000000000000E+00 |
| c64 | $x^2 y^8$ | −1.382388481590E−13 | 0.000000000000E+00 |
| c65 | $xy^9$ | 0.000000000000E+00 | 0.000000000000E+00 |
| c66 | $y^{10}$ | −2.349220379980E−14 | 0.000000000000E+00 |

| Coefficients | comment | Surface 3 | Surface 4 |
|---|---|---|---|
| cuy | c | −0.047502239 | 4.62503916636415E−03 |
| c67 | normalized radius | 1 | 1 |
| c1 | k | 0 | 0 |
| c2 | x | 0 | 0 |
| c3 | y | −3.713820097050E−01 | −7.889190949566E−02 |
| c4 | $x^2$ | −7.602734138830E−03 | 9.061467713679E−03 |
| c5 | xy | 0.000000000000E+00 | 0.000000000000E+00 |
| c6 | $y^2$ | −1.328060538820E−02 | −7.440925962039E−04 |
| c7 | $x^3$ | 0.000000000000E+00 | 0.000000000000E+00 |
| c8 | $x^2 y$ | −6.162600900670E−04 | −1.334980089604E−04 |
| c9 | $xy^2$ | 0.000000000000E+00 | 0.000000000000E+00 |
| c10 | $y^3$ | 2.698297276700E−03 | −1.082388324657E−05 |
| c11 | $x^4$ | −1.036808360720E−05 | −6.869154882657E−06 |
| c12 | $x^3 y$ | 0.000000000000E+00 | 0.000000000000E+00 |
| c13 | $x^2 y^2$ | 6.395534320820E−04 | 2.537076127696E−05 |
| c14 | $xy^3$ | 0.000000000000E+00 | 0.000000000000E+00 |
| c15 | $y^4$ | 5.348289994560E−04 | 2.872950078172E−06 |
| c16 | $x^5$ | 0.000000000000E+00 | 0.000000000000E+00 |
| c17 | $x^4 y$ | −7.243323994940E−06 | 3.579225277335E−07 |
| c18 | $x^3 y^2$ | 0.000000000000E+00 | 0.000000000000E+00 |
| c19 | $x^2 y^3$ | −2.631914617550E−05 | 7.674060144164E−07 |
| c20 | $xy^4$ | 0.000000000000E+00 | 0.000000000000E+00 |
| c21 | $y^5$ | −1.207571795570E−04 | 2.343305375169E−07 |
| c22 | $x^6$ | 6.925182707110E−08 | 3.531736575015E−08 |
| c23 | $x^5 y$ | 0.000000000000E+00 | 0.000000000000E+00 |
| c24 | $x^4 y^2$ | −4.354972387950E−06 | −1.047604139930E−07 |
| c25 | $x^3 y^3$ | 0.000000000000E+00 | 0.000000000000E+00 |
| c26 | $x^2 y^4$ | −5.469927852330E−06 | −7.816094559917E−08 |
| c27 | $xy^5$ | 0.000000000000E+00 | 0.000000000000E+00 |
| c28 | $y^6$ | −1.348379393160E−05 | 5.437264126834E−08 |
| c29 | $x^7$ | 0.000000000000E+00 | 0.000000000000E+00 |
| c30 | $x^6 y$ | 0.000000000000E+00 | −2.345712968586E−09 |
| c31 | $x^5 y^2$ | 0.000000000000E+00 | 0.000000000000E+00 |
| c32 | $x^4 y^3$ | 0.000000000000E+00 | −9.776159457326E−10 |
| c33 | $x^3 y^4$ | 0.000000000000E+00 | 0.000000000000E+00 |
| c34 | $x^2 y^5$ | 0.000000000000E+00 | −3.747602576420E−09 |
| c35 | $xy^6$ | 0.000000000000E+00 | 0.000000000000E+00 |
| c36 | $y^7$ | 0.000000000000E+00 | −3.134464841907E−09 |
| c37 | $x^8$ | 0.000000000000E+00 | −1.684012356810E−10 |
| c38 | $x^7 y$ | 0.000000000000E+00 | 0.000000000000E+00 |
| c39 | $x^6 y^2$ | 0.000000000000E+00 | 4.535953132119E−10 |
| c40 | $x^5 y^3$ | 0.000000000000E+00 | 0.000000000000E+00 |
| c41 | $x^4 y^4$ | 0.000000000000E+00 | 7.837817283276E−10 |
| c42 | $x^3 y^5$ | 0.000000000000E+00 | 0.000000000000E+00 |
| c43 | $x^2 y^6$ | 0.000000000000E+00 | 2.755761921660E−10 |
| c44 | $xy^7$ | 0.000000000000E+00 | 0.000000000000E+00 |
| c45 | $y^8$ | 0.000000000000E+00 | −5.916877897125E−10 |
| c46 | $x^9$ | 0.000000000000E+00 | 0.000000000000E+00 |
| c47 | $x^8 y$ | 0.000000000000E+00 | 4.770943033528E−12 |
| c48 | $x^7 y^2$ | 0.000000000000E+00 | 0.000000000000E+00 |
| c49 | $x^6 y^3$ | 0.000000000000E+00 | −2.951188218903E−13 |
| c50 | $x^5 y^4$ | 0.000000000000E+00 | 0.000000000000E+00 |
| c51 | $x^4 y^5$ | 0.000000000000E+00 | 3.371749455954E−12 |
| c52 | $x^3 y^6$ | 0.000000000000E+00 | 0.000000000000E+00 |
| c53 | $x^2 y^7$ | 0.000000000000E+00 | 1.747159621915E−11 |
| c54 | $xy^8$ | 0.000000000000E+00 | 0.000000000000E+00 |
| c55 | $y^9$ | 0.000000000000E+00 | 8.129325561197E−12 |
| c56 | $x^{10}$ | 0.000000000000E+00 | 2.312868445063E−13 |
| c57 | $x^9 y$ | 0.000000000000E+00 | 0.000000000000E+00 |
| c58 | $x^8 y^2$ | 0.000000000000E+00 | −7.302980007283E−13 |
| c59 | $x^7 y^3$ | 0.000000000000E+00 | 0.000000000000E+00 |
| c60 | $x^6 y^4$ | 0.000000000000E+00 | −8.710198057552E−13 |
| c61 | $x^5 y^5$ | 0.000000000000E+00 | 0.000000000000E+00 |
| c62 | $x^4 y^6$ | 0.000000000000E+00 | −2.578655721303E−12 |
| c63 | $x^3 y^7$ | 0.000000000000E+00 | 0.000000000000E+00 |
| c64 | $x^2 y^8$ | 0.000000000000E+00 | 1.049427758427E−13 |
| c65 | $xy^9$ | 0.000000000000E+00 | 0.000000000000E+00 |
| c66 | $y^{10}$ | 0.000000000000E+00 | 1.997616885026E−12 |

TABLE 9

| Coefficients | comment | Surface 1 | Surface 2 |
|---|---|---|---|
| cuy | c | 5.05744188235277E−03 | 1.01290420358428E−02 |
| c67 | normalized radius | 1 | 1 |
| c1 | k | −1.00000000000000E+00 | −1.00000000000000E+00 |
| c2 | x | 0.00000000000000E+00 | 0.00000000000000E+00 |
| c3 | y | 0.00000000000000E+00 | 0.00000000000000E+00 |
| c4 | $x^2$ | −1.06569604270328E−02 | −1.98880360585134E−02 |
| c5 | xy | 0.00000000000000E+00 | 0.00000000000000E+00 |
| c6 | $y^2$ | −1.68658939805653E−03 | −1.19385116890299E−02 |
| c7 | $x^3$ | 0.00000000000000E+00 | 0.00000000000000E+00 |
| c8 | $x^2 y$ | 6.91090618400814E−05 | 9.33625592200568E−06 |
| c9 | $xy^2$ | 0.00000000000000E+00 | 0.00000000000000E+00 |
| c10 | $y^3$ | 2.20768710346282E−04 | −2.29081872204714E−04 |
| c11 | $x^4$ | −6.83962391749639E−06 | −2.78401802376246E−06 |
| c12 | $x^3 y$ | 0.00000000000000E+00 | 0.00000000000000E+00 |
| c13 | $x^2 y^2$ | −3.05668325239866E−05 | −1.72926734056902E−05 |
| c14 | $xy^3$ | 0.00000000000000E+00 | 0.00000000000000E+00 |
| c15 | $y^4$ | −1.36336411152319E−05 | −1.96766859030307E−05 |
| c16 | $x^5$ | 0.00000000000000E+00 | 0.00000000000000E+00 |
| c17 | $x^4 y$ | 8.58870602989718E−07 | −3.48208722714691E−07 |
| c18 | $x^3 y^2$ | 0.00000000000000E+00 | 0.00000000000000E+00 |
| c19 | $x^2 y^3$ | 2.59849465399784E−07 | 2.19795381577235E−06 |
| c20 | $xy^4$ | 0.00000000000000E+00 | 0.00000000000000E+00 |
| c21 | $y^5$ | 1.30586738289348E−06 | 2.43633240996974E−06 |
| c22 | $x^6$ | 2.43871462953907E−07 | 3.17005397026433E−08 |
| c23 | $x^5 y$ | 0.00000000000000E+00 | 0.00000000000000E+00 |
| c24 | $x^4 y^2$ | −2.17171575262769E−07 | −8.43008544990865E−09 |
| c25 | $x^3 y^3$ | 0.00000000000000E+00 | 0.00000000000000E+00 |
| c26 | $x^2 y^4$ | −1.09469718343971E−07 | −3.80934245038872E−08 |
| c27 | $xy^5$ | 0.00000000000000E+00 | 0.00000000000000E+00 |
| c28 | $y^6$ | −1.27848463353098E−07 | 6.91418873061873E−08 |
| c29 | $x^7$ | 0.00000000000000E+00 | 0.00000000000000E+00 |
| c30 | $x^6 y$ | −2.17215958916219E−10 | −5.29841934213626E−09 |
| c31 | $x^5 y^2$ | 0.00000000000000E+00 | 0.00000000000000E+00 |
| c32 | $x^4 y^3$ | 1.17052458860851E−08 | 8.21084328918049E−09 |
| c33 | $x^3 y^4$ | 0.00000000000000E+00 | 0.00000000000000E+00 |
| c34 | $x^2 y^5$ | 9.68888754082781E−09 | −7.97369765852189E−09 |

TABLE 9-continued

| | | | |
|---|---|---|---|
| c35 | $xy^6$ | 0.00000000000000E+00 | 0.00000000000000E+00 |
| c36 | $y^7$ | 3.27432053769373E−09 | −1.04667540576694E−08 |
| c37 | $x^8$ | −7.15087135594710E−10 | 1.58107927123443E−10 |
| c38 | $x^7 y$ | 0.00000000000000E+00 | 0.00000000000000E+00 |
| c39 | $x^6 y^2$ | 8.37241810688380E−11 | 2.50870549731047E−10 |
| c40 | $x^5 y^3$ | 0.00000000000000E+00 | 0.00000000000000E+00 |
| c41 | $x^4 y^4$ | 3.08448109642484E−10 | −7.25055775891319E−10 |
| c42 | $x^3 y^5$ | 0.00000000000000E+00 | 0.00000000000000E+00 |
| c43 | $x^2 y^6$ | 4.69822713757874E−10 | −3.40656761505412E−10 |
| c44 | $xy^7$ | 0.00000000000000E+00 | 0.00000000000000E+00 |
| c45 | $y^8$ | 3.74205140407221E−11 | −9.66678413418157E−10 |
| c46 | $x^9$ | 0.00000000000000E+00 | 0.00000000000000E+00 |
| c47 | $x^8 y$ | −6.76193659551364E−11 | 1.12952194048511E−11 |
| c48 | $x^7 y^2$ | 0.00000000000000E+00 | 0.00000000000000E+00 |
| c49 | $x^6 y^3$ | 2.52161603900163E−11 | −7.04825907294106E−11 |
| c50 | $x^5 y^4$ | 0.00000000000000E+00 | 0.00000000000000E+00 |
| c51 | $x^4 y^5$ | −1.74613643937042E−10 | 6.33946672763876E−11 |
| c52 | $x^3 y^6$ | 0.00000000000000E+00 | 0.00000000000000E+00 |
| c53 | $x^2 y^7$ | −4.02373533060283E−11 | 6.52431095363973E−11 |
| c54 | $xy^8$ | 0.00000000000000E+00 | 0.00000000000000E+00 |
| c55 | $y^9$ | −1.51494734534747E−12 | 1.16444692674563E−10 |
| c56 | $x^{10}$ | −2.04692546379699E−13 | −9.55272275007493E−13 |
| c57 | $x^9 y$ | 0.00000000000000E+00 | 0.00000000000000E+00 |
| c58 | $x^8 y^2$ | 1.27850873405047E−12 | 1.26785440782157E−12 |
| c59 | $x^7 y^3$ | 0.00000000000000E+00 | 0.00000000000000E+00 |
| c60 | $x^6 y^4$ | 3.62506934749027E−12 | 2.65220449427970E−12 |
| c61 | $x^5 y^5$ | 0.00000000000000E+00 | 0.00000000000000E+00 |
| c62 | $x^4 y^6$ | 6.19013257835136E−12 | −2.60617377673244E−12 |
| c63 | $x^3 y^7$ | 0.00000000000000E+00 | 0.00000000000000E+00 |
| c64 | $x^2 y^8$ | 5.47840265443679E−13 | −1.51560477272646E−12 |
| c65 | $xy^9$ | 0.00000000000000E+00 | 0.00000000000000E+00 |
| c66 | $y^{10}$ | −8.21677804323237E−15 | −3.02669599955700E−12 |

| Coefficients | comment | Surface 3 | Surface 4 |
|---|---|---|---|
| cuy | c | −1.36040070302022E−01 | −3.57225273631067E−03 |
| c67 | normalized radius | 1 | 1 |
| c1 | k | −1.00000000000000E+00 | −3.05442384082650E+02 |
| c2 | x | 0.00000000000000E+00 | 0.00000000000000E+00 |
| c3 | y | 0.00000000000000E+00 | 1.50268084206787E−02 |
| c4 | $x^2$ | 4.02243465863783E−02 | −6.19425352271504E−03 |
| c5 | xy | 0.00000000000000E+00 | 0.00000000000000E+00 |
| c6 | $y^2$ | −2.13980634999507E−02 | 4.47303500982809E−03 |
| c7 | $x^3$ | 0.00000000000000E+00 | 0.00000000000000E+00 |
| c8 | $x^2 y$ | −3.01138835536447E−03 | −1.20873088719341E−04 |
| c9 | $xy^2$ | 0.00000000000000E+00 | 0.00000000000000E+00 |
| c10 | $y^3$ | −2.02440549644019E−02 | 4.88846955792256E−05 |
| c11 | $x^4$ | −4.47796859910435E−04 | −3.55281378009418E−07 |
| c12 | $x^3 y$ | 0.00000000000000E+00 | 0.00000000000000E+00 |
| c13 | $x^2 y^2$ | 3.77675855322595E−03 | −1.85583369659820E−05 |
| c14 | $xy^3$ | 0.00000000000000E+00 | 0.00000000000000E+00 |
| c15 | $y^4$ | 4.80144970995529E−03 | −9.25174463073967E−06 |
| c16 | $x^5$ | 0.00000000000000E+00 | 0.00000000000000E+00 |
| c17 | $x^4 y$ | 4.02927533244600E−05 | −3.50332571416944E−07 |
| c18 | $x^3 y^2$ | 0.00000000000000E+00 | 0.00000000000000E+00 |
| c19 | $x^2 y^3$ | 5.39169467243012E−05 | 2.04967612461798E−07 |
| c20 | $xy^4$ | 0.00000000000000E+00 | 0.00000000000000E+00 |
| c21 | $y^5$ | 5.53544127253446E−04 | −4.65892543560338E−08 |
| c22 | $x^6$ | 1.11280354729252E−05 | −5.29354102911361E−09 |
| c23 | $x^5 y$ | 0.00000000000000E+00 | 0.00000000000000E+00 |
| c24 | $x^4 y^2$ | −4.80012193062278E−05 | 4.02601860330999E−09 |
| c25 | $x^3 y^3$ | 0.00000000000000E+00 | 0.00000000000000E+00 |
| c26 | $x^2 y^4$ | −1.26051539656191E−04 | 2.49939246096273E−08 |
| c27 | $xy^5$ | 0.00000000000000E+00 | 0.00000000000000E+00 |
| c28 | $y^6$ | −1.73588932255855E−06 | 3.61819538534118E−08 |
| c29 | $x^7$ | 0.00000000000000E+00 | 0.00000000000000E+00 |
| c30 | $x^6 y$ | −8.79779758365947E−07 | 2.01195864259020E−09 |
| c31 | $x^5 y^2$ | 0.00000000000000E+00 | 0.00000000000000E+00 |
| c32 | $x^4 y^3$ | 3.02147026981469E−06 | −4.57346927308613E−10 |
| c33 | $x^3 y^4$ | 0.00000000000000E+00 | 0.00000000000000E+00 |
| c34 | $x^2 y^5$ | −3.77643718632961E−06 | 1.24553105773878E−09 |
| c35 | $xy^6$ | 0.00000000000000E+00 | 0.00000000000000E+00 |
| c36 | $y^7$ | −3.76456044984959E−06 | −1.79376358056304E−09 |
| c37 | $x^8$ | −1.15675211759524E−07 | 2.21527691875407E−10 |
| c38 | $x^7 y$ | 0.00000000000000E+00 | 0.00000000000000E+00 |
| c39 | $x^6 y^2$ | 2.78655613640253E−07 | −2.53421606734412E−10 |
| c40 | $x^5 y^3$ | 0.00000000000000E+00 | 0.00000000000000E+00 |
| c41 | $x^4 y^4$ | 9.84349649743337E−07 | −5.74780760494471E−11 |
| c42 | $x^3 y^5$ | 0.00000000000000E+00 | 0.00000000000000E+00 |
| c43 | $x^2 y^6$ | 2.49702108607953E−06 | −1.17433001848088E−11 |
| c44 | $xy^7$ | 0.00000000000000E+00 | 0.00000000000000E+00 |
| c45 | $y^8$ | 2.58861741885522E−06 | −3.74142357461756E−10 |
| c46 | $x^9$ | 0.00000000000000E+00 | 0.00000000000000E+00 |
| c47 | $x^8 y$ | 6.03461822581042E−09 | −9.50023944707191E−12 |
| c48 | $x^7 y^2$ | 0.00000000000000E+00 | 0.00000000000000E+00 |
| c49 | $x^6 y^3$ | −1.70606513975964E−08 | 7.11512617425205E−12 |
| c50 | $x^5 y^4$ | 0.00000000000000E+00 | 0.00000000000000E+00 |
| c51 | $x^4 y^5$ | −1.33127271883197E−08 | −1.18995002675616E−12 |
| c52 | $x^3 y^6$ | 0.00000000000000E+00 | 0.00000000000000E+00 |
| c53 | $x^2 y^7$ | 4.80199259903842E−08 | −3.34840697581670E−13 |
| c54 | $xy^8$ | 0.00000000000000E+00 | 0.00000000000000E+00 |
| c55 | $y^9$ | −2.98879732404454E−08 | 1.00015126063979E−11 |
| c56 | $x^{10}$ | 4.69852812284116E−10 | −6.12912070190102E−13 |
| c57 | $x^9 y$ | 0.00000000000000E+00 | 0.00000000000000E+00 |
| c58 | $x^8 y^2$ | −5.85068948593321E−10 | 1.03108702382589E−12 |
| c59 | $x^7 y^3$ | 0.00000000000000E+00 | 0.00000000000000E+00 |
| c60 | $x^6 y^4$ | −3.09449504677830E−09 | −2.49697011108537E−13 |
| c61 | $x^5 y^5$ | 0.00000000000000E+00 | 0.00000000000000E+00 |
| c62 | $x^4 y^6$ | −5.78412894302924E−09 | −5.08864307560358E−14 |
| c63 | $x^3 y^7$ | 0.00000000000000E+00 | 0.00000000000000E+00 |
| c64 | $x^2 y^8$ | −2.34559082177138E−08 | 2.18880110409132E−13 |
| c65 | $xy^9$ | 0.00000000000000E+00 | 0.00000000000000E+00 |
| c66 | $y^{10}$ | −1.17892981297852E−08 | 9.10176395465433E−13 |

What is claimed is:

1. A prism-lens for use in an optical see-through head-mounted display, comprising:
   a first surface configured to receive light from a micro-display and configured to transmit the received light into the body of the prism-lens;
   a second surface configured to receive the light transmitted into the body of the prism-lens from the first surface and configured to totally internally reflect, the received light at the second surface; and
   a third surface configured to receive the light reflected by the second surface and configured to reflect the light out of the prism-lens,
wherein the second surface is oriented such that $$\begin{cases} \theta_{1b1} < \arcsin(1/n), & \theta_1 \le 0, \text{ and} \\ \theta_{2u1} < \arcsin(1/n), & \theta_1 \ge 0 \end{cases}$$

where $\theta_{1b1}$ is an incident angle of a bottom marginal ray, $R_{1b}$, at the second surface, $\theta_{2u1}$ is an incident angle of a top marginal ray, $R_{2u}$, at the second surface, n is the refractive index of the prism-lens material, and $\theta_1$ is the tilt angle of the second surface about an axis orthogonal to an optical axis extending from the micro-display through the prism-lens and wherein a positive degree of $\theta_1$ corresponds to a clockwise tilting of the second surface and a negative degree of $\theta_1$ corresponds to a counter clockwise tilting of the second surface.

2. The prism-lens according to claim 1, wherein the first surface is described by $$z = \frac{c(x^2 + y^2)}{1 + \text{sqrt}(1 - (1+k)c^2(x^2+y^2))} + \sum_{j=2}^{66} C_j x^m y^n,$$

$$j = [(m+n)^2 + m + 3n]/2 + 1,$$

where the z is the sag of the first surface measured along the z-axis of a local x, y, z coordinate system, c is the vertex curvature (CUY), k is the conic constant m+n≤10, and $C_j$ is the coefficient for $x^m y^n$.

3. The prism-lens according to claim 2, wherein the second surface is described by $$z = \frac{c(x^2 + y^2)}{1 + \sqrt{1 - (1+k)c^2(x^2+y^2)}} + \sum_{j=2}^{66} C_j x^m y^n,$$

$$j = [(m+n)^2 + m + 3n]/2 + 1,$$

where the z is the sag of the second surface measured along the z-axis of a local x, y, z coordinate system, c is the vertex curvature (CUY), k is the conic constant, $m+n \leq 10$, and $C_j$ is the coefficient for $x^m y^n$.

4. The prism-lens according to claim 3, wherein the third surface is described by $$z = \frac{c(x^2 + y^2)}{1 + \sqrt{1 - (1+k)c^2(x^2+y^2)}} + \sum_{j=2}^{66} C_j x^m y^n,$$

$$j = [(m+n)^2 + m + 3n]/2 + 1,$$

where the z is the sag of the third surface measured along the z-axis of a local x, y, z coordinate system, c is the vertex curvature (CUY), k is the conic constant, $m+n \leq 10$, and $C_j$ is the coefficient for $x^m y^n$.

5. The prism-lens according to claim 1, wherein the second surface is described by $$z = \frac{c_x x^2 + c_y y^2}{1 + \sqrt{1 - (1+k_x)c_x x^2 - (1+k_y)c_y y^2}} + \sum_{j=1}^{37} C_j x^{2m} y^n$$

$$2m + n \leq 10, m = 0, 1, 2, 3, 4, 5, n = 0, 1, \ldots, 10,$$

where the z is the sag of the at least one surface measured along the z-axis of a local x, y, z coordinate system, $c_x$ is the radius of curvature of the at least one surface in the sagittal direction, $c_y$ is the radius of curvature of at least one surface in the tangential direction, and $C_j$ is the coefficient $x^{2m} y^n$.

6. The prism-lens according to claim 1, wherein the third surface is partially mirrored to permit the internally reflected light to be reflected by the third surface and to permit light from a real-world view to be transmitted through the third surface to the exit pupil.

7. The prism-lens according to claim 1, wherein second and third surfaces are configured to provide a wedge-shaped prism lens.

8. The prism-lens according to claim 1, wherein the z-axis is parallel to the optical axis at the exit pupil, and the prism lens is symmetric about the y-z plane and asymmetric about the x-z plane.

9. The prism-lens according to claim 1, wherein the diagonal field of view is at least 40 degrees.

10. The prism-lens according to claim 1, wherein the exit pupil diameter is at least 6 mm.

11. The prism-lens according to claim 1, wherein the modulation transfer function is at least 10%×30 lps/mm.

12. The prism-lens according to claim 1, wherein the eye clearance is at least 16 mm.

13. An optical assembly comprising the prism lens according to claim 1, comprising an auxiliary lens disposed proximate the third surface, the auxiliary lens configured to minimize the shift and distortion of rays from a real-world scene by the second and third surfaces of the prism-lens.

14. An optical assembly comprising the prism lens according to claim 13, wherein the auxiliary lens has a surface with the same shape as the third surface of the prism-lens and is disposed in optical contact with the third surface of the prism-lens.

15. The prism-lens according to claim 14, wherein at least one surface of the auxiliary lens is described by $$z = \frac{c(x^2 + y^2)}{1 + \sqrt{1 - (1+k)c^2(x^2+y^2)}} + \sum_{j=2}^{66} C_j x^m y^n,$$

$$j = [(m+n)^2 + m + 3n]/2 + 1,$$

where the z is the sag of the at least one surface measured along the z-axis of a local x, y, z coordinate system, c is the vertex curvature (CUY), k is the conic constant, $m+n \leq 10$, and $C_j$ is the coefficient for $x^m y^n$.

16. The prism-lens according to claim 15, wherein the modulation transfer function is at least 10%×30 lps/mm across the entire visual field.

17. The prism-lens according to claim 13, wherein at least one surface of the auxiliary lens is described by $$z = \frac{c_x x^2 + c_y y^2}{1 + \sqrt{1 - (1+k_x)c_x x^2 - (1+k_y)c_y y^2}} + \sum_{j=1}^{37} C_j x^{2m} y^n$$

$$2m + n \leq 10, m = 0, 1, 2, 3, 4, 5, n = 0, 1, \ldots, 10,$$

where the z is the sag of the at least one surface measured along the z-axis of a local x, y, z coordinate system, $c_x$ is the radius of curvature of the at least one surface in the sagittal direction, $c_y$ is the radius of curvature of at least one surface in the tangential direction, and $C_j$ is the coefficient for $x^{2m} y^n$.

18. The prism-lens according to claim 17, wherein the modulation transfer function is at least 10%×30 lps/mm across the entire visual field.

19. The prism-lens according to claim 1, wherein the prism-lens has an f-number less than 2.

20. The prism-lens according to claim 1, wherein one or more of the first, second, and third surfaces is a free-form surface.

21. The prism-lens according to claim 1, wherein each of the first, second, and third surfaces is a free-form surface.

* * * * *